(12) United States Patent
Boehni et al.

(10) Patent No.: US 10,071,756 B2
(45) Date of Patent: Sep. 11, 2018

(54) SYSTEM AND METHOD FOR FLEET WHEEL-RAIL LUBRICATION AND NOISE MANAGEMENT

(71) Applicant: IGRALUB NORTH AMERICA, LLC, Marietta, GA (US)

(72) Inventors: Kurt A. Boehni, Roswell, GA (US); Andre Kofmehl, Zurich (CH)

(73) Assignee: Igralub North America, LLC, Marietta, GA (US)

( * ) Notice: Subject to any disclaimer, the term of this patent is extended or adjusted under 35 U.S.C. 154(b) by 0 days.

(21) Appl. No.: 15/347,328

(22) Filed: Nov. 9, 2016

(65) Prior Publication Data

US 2017/0232981 A1    Aug. 17, 2017

Related U.S. Application Data

(63) Continuation of application No. 13/872,768, filed on Apr. 29, 2013, now abandoned.

(60) Provisional application No. 61/639,772, filed on Apr. 27, 2012.

(51) Int. Cl.
| | |
|---|---|
| *B61K 3/02* | (2006.01) |
| *B61K 3/00* | (2006.01) |
| *B61K 9/08* | (2006.01) |
| *B61K 9/12* | (2006.01) |
| *F16N 29/00* | (2006.01) |

(52) U.S. Cl.
CPC .............. *B61K 3/02* (2013.01); *B61K 3/00* (2013.01); *B61K 9/08* (2013.01); *B61K 9/12* (2013.01); *F16N 29/00* (2013.01)

(58) Field of Classification Search
CPC ... B61K 3/02; B61K 3/00; B61K 9/08; B61K 9/12; F16N 29/00
USPC .............. 701/19; 184/3.2, 3.1, 104.1; 291/3; 74/467, 587, 605; 104/279; 508/110; 246/167 R; 700/282, 241; 422/106
See application file for complete search history.

(56) References Cited

U.S. PATENT DOCUMENTS

| | | | |
|---|---|---|---|
| 4,930,606 | A | 6/1990 | Sporzynski et al. |
| 5,978,717 | A | 11/1999 | Ebersohn et al. |
| 6,101,427 | A | 8/2000 | Yang |
| 6,170,610 | B1 | 1/2001 | Kumar |

(Continued)

FOREIGN PATENT DOCUMENTS

| | | |
|---|---|---|
| EP | 0926426 | 10/1998 |
| KR | 2006065596 | 6/2006 |
| WO | WO2011/143765 | 11/2011 |

*Primary Examiner* — Marthe Y Marc-Coleman
(74) *Attorney, Agent, or Firm* — Smith, Gambrell & Russell, LLP

(57) ABSTRACT

The present invention is a system and method for the control of applying lubrication to the wheels of a fleet of railed-based vehicles and the rails on which the railed-based vehicles travel. In an aspect, the wheel-rail lubrication fleet management system is configured to analyze and optimize the application of wheel/rail lubrication within a whole fleet to the best possible efficiency. In an additional aspect, the wheel-rail lubrication fleet management system is further configured to manage the noise created by the interaction between the wheels and rails of the whole fleet. In such aspects, the wheel-rail lubrication fleet management system can monitor the real results of the application of lubricant of rail-wheel systems that utilize the lubrication fleet management system.

21 Claims, 22 Drawing Sheets

(56) References Cited

U.S. PATENT DOCUMENTS

| | | |
|---|---|---|
| 6,578,669 B2 | 6/2003 | Kast et al. |
| 6,991,065 B2 | 1/2006 | Leslie et al. |
| 7,164,975 B2 | 1/2007 | Bidaud |
| 7,277,778 B2 | 10/2007 | Burns, Sr. |
| 7,548,032 B2 | 6/2009 | Alton, Jr. |
| 7,594,682 B2 | 9/2009 | Kumar et al. |
| 7,784,840 B2 | 8/2010 | Leslie |
| 8,544,607 B2 * | 10/2013 | Iden ........................ B61K 3/02 184/3.2 |
| 2002/0157901 A1 * | 10/2002 | Kast ........................ B61K 3/02 184/3.2 |
| 2004/0031647 A1 | 2/2004 | Leslie et al. |
| 2005/0253397 A1 | 11/2005 | Kumar et al. |
| 2005/0285408 A1 | 12/2005 | Eadie et al. |
| 2007/0219680 A1 * | 9/2007 | Kumar .................... B61L 3/006 701/19 |
| 2007/0272286 A1 | 11/2007 | Curtius et al. |
| 2011/0153094 A1 | 6/2011 | Botha |
| 2012/0150370 A1 | 6/2012 | Oldknow et al. |
| 2013/0233649 A1 | 9/2013 | Appleby et al. |

\* cited by examiner

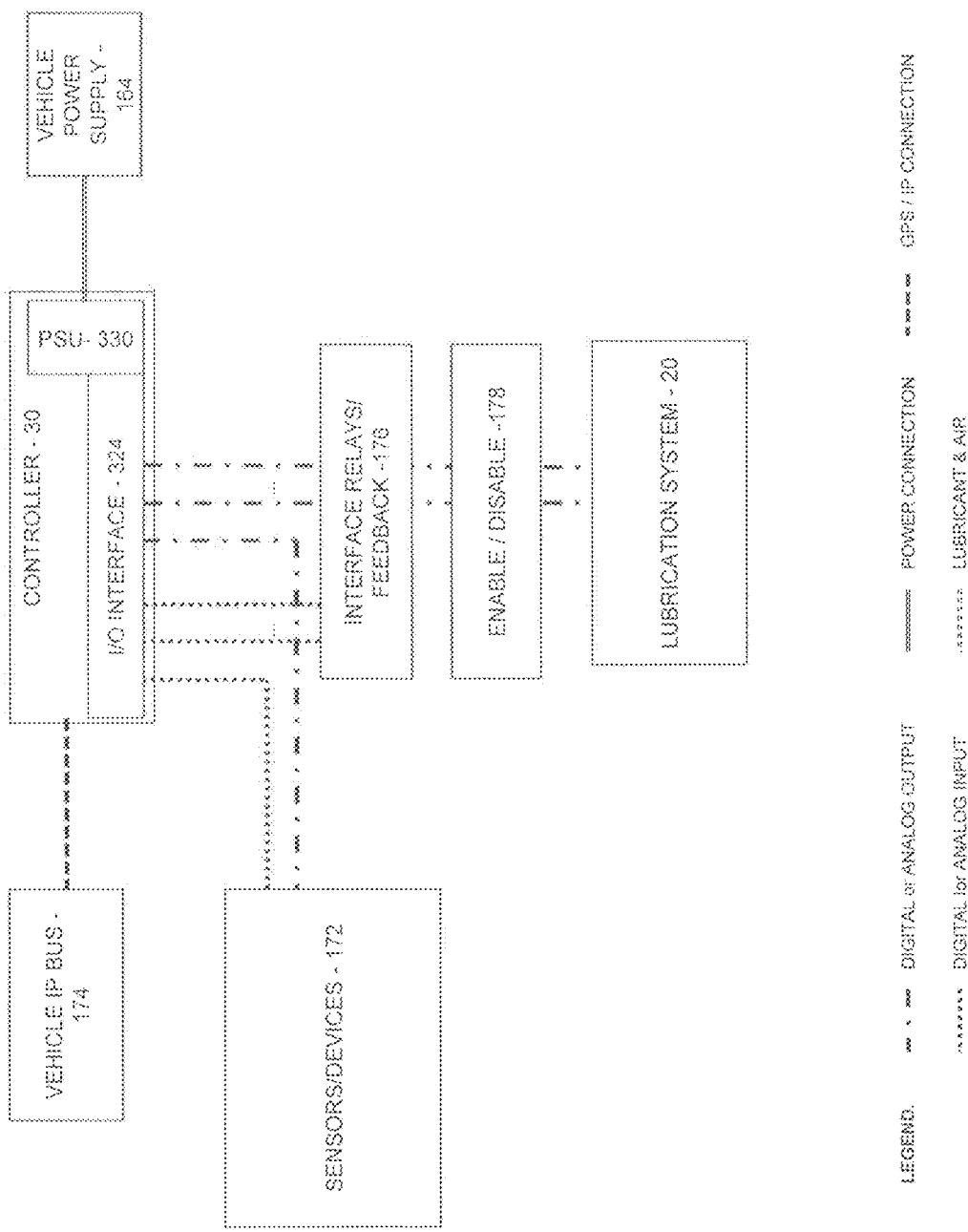

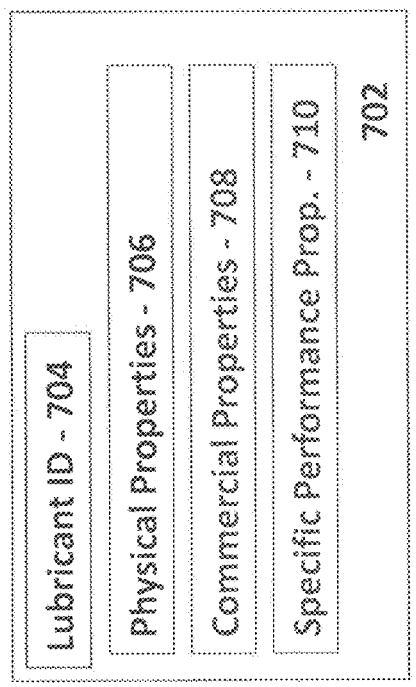
FIG. 13
FIG. 17
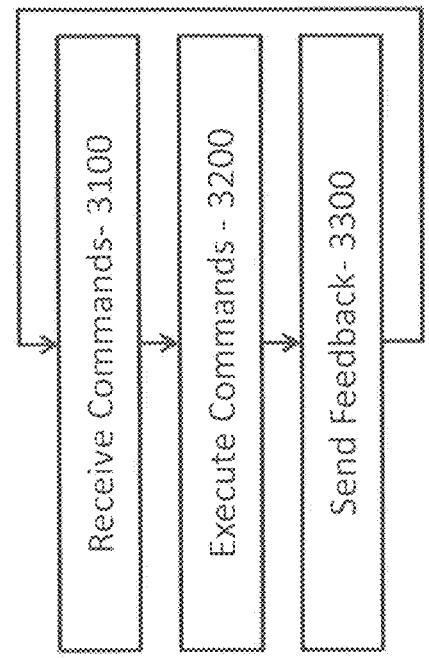
FIG. 19

SYSTEM AND METHOD FOR FLEET WHEEL-RAIL LUBRICATION AND NOISE MANAGEMENT

CLAIM OF PRIORITY

This application claims priority from and is a continuation of U.S. patent application Ser. No. 13/872,768 filed on Apr. 29, 2013, which claims priority from U.S. Provisional Patent Application No. 61/639,772 filed on Apr. 27, 2012, which are relied upon and incorporated herein in their entirety by reference.

BACKGROUND OF THE INVENTION

Technical Field

The present invention is in the technical field of wheel/rail wear and noise management among rail vehicles. More particularly, the present invention is in the technical field of a fleet lubrication operating system.

Related Art

Old or poorly maintained rail infrastructure, train wheels, or a combination of both can increase "wheel-climbing" and other known unfortunate wheel/rail dynamic occurrences, increasing the chances of a rail vehicle derailing event. Rail-vehicle derailments are always events that should be avoided, considering the high probability of loss of lives, as well as the costs resulting from the damage and subsequent repairs. For example, as published, the average derailment cost in the United States is currently estimated to be $1.4 million per derailment incident.

The normal wear and tear on rails and wheels is a common problem that all rail-based vehicles face. The corrugation and normal wear and tear requires the wheels and rails to be re-profiled and re-grinded throughout the life of the wheels and rails, as well as frequent replacement when such rails and wheels are no longer able to be repaired.

Further, the friction experienced between the wheels and rails, also called a wheel/rail interface, has a great impact on the performance and safety of the rail-based vehicles, including the number of engines needed to pull or push a collection of rail-based vehicles, as well as the increase in energy needed. Further, a common problem that occurs between the interaction between the rails and the wheels of the rail-based vehicles is curve squeaking, the noise resulting from the interaction of rails and wheels in curved portions of a track. Curve squeaking is an undesirable nuisance for those residences and businesses in the vicinity of rail tracks.

The two main frictions occurring between rail-based vehicles and rails are the enormous vertical force 4 and lateral force 5 applied to the interface between the wheel 1 and rail 2, as illustrated in FIG. 1. The lateral forces 5 cause friction between the flange 3 of any wheel 1 and the rail 2. The vertical forces 4 cause friction along the top of the rail 2 which engages the wheel 1. These frictions are greatly increased at curves occurring in the rail 2, with much the greater vertical friction occurring along the outer rail and as well as on the top of the inner rail, as shown in FIG. 2. As discussed above, curve squeaking is a result of both of these frictions, with each type of friction contributing specific noise characteristics which can be combined into a single heard sound, as shown in FIG. 3.

The lubrication of the wheels 1 of the railed-based vehicles as well as the rails 2 themselves can reduce the problems discussed above. Based on the physics and dynamics of the wheel/rail interface among all rail vehicles, and the needs to protect the rail vehicle components, the industry differentiates between four different wheel/rail lubrication applications: Wheel-Flange Lubrication, Top of Rail (TOR) or Rail-Head lubrication, Wheel/Rail Conditioning, and Component Lubrication.

Wheel-Flange lubrication involves lubricant (or a friction modifier) being applied to the inner flange 3 of a vehicle's wheel 1 to address lateral friction 5 (as shown in FIG. 1), which is caused by the centrifugal forces applied by the wheel flange 3 to the inner side of the outer rail 1. The centrifugal forces are at the greatest when a train goes travels through a curve. Wheel flange lubrication also addresses many issues created by the general wheel/rail dynamic, where lateral and vertical forces between the inner wheel-flange 3 and the inner rail 2 constantly occur. When groove-rails are employed, usually in instances where rail 2 shares paths with other transportation vehicles (e.g., street cars and trams traveling on streets), lubricant is applied on both sides of the wheel-flange.

TOR lubrication involves lubricant being applied only to the top of the rail 2. TOR lubrication addresses specifically the lateral wheel movement on the inner rail in a curve, as well as the slip-slide and creeping effect, which is caused by the wheel/rail dynamics. TOR lubrication deals with very different application requirements than wheel-flange lubrication. The TOR application method and strategies require a much higher quality lubricant/friction modifier, which are much more costly than lubricants/friction modifier utilized in the wheel-flange lubrication. Only lubricants designed specifically TOR application can handle the higher forces. Therefore, more advanced application systems are needed to keep the needed friction coefficient on top of the rail intact and to guarantee that breaking distance is not extended. Many rail-operators today are still afraid to apply lubricant on top of the rail, believing the rail-based vehicle may lose traction as a result.

Wheel/rail conditioning occurs when lubricant is to not only prevent friction and noises, but also to control the correct or ideal friction coefficient as well as to prevent/reduce corrosion, reduce wheel/rail interface driving noises, and improve overall safety and passenger comfort of a rail vehicle. In some situations, both wheel/flange and TOR lubrications may also be included wheel/rail conditioning.

Last, component lubrication occurs when lubrication is applied to other friction causing components, such as track switches, turnouts, frogs and guardrails or vehicle couplers which require their own lubrication systems or manual lubrication maintenance.

Many lubrication components and systems have been used to perform the application of lubricants when needed. Such components can be include on-board lubrication systems, including, but not limited to on-board lubrication systems controlled by curve, speed, sensors or time depended lubrication systems, accelerometers, or simple mechanically applied (e.g., spring-loaded) friction modifier sticks, such as the Kelsan™ friction modifier stick. In addition, stationary lubrication systems (also known as track-side or wayside systems), which apply lubricant to the wheel/rail interface, can be used. Such stationary systems can apply lubricant when a rail vehicle drives over it, or can be controlled by simple algorithms, which can count the vehicles, axles, number of trains, and/or the time period has passed.

While the industry does have various applications and devices to apply the lubrication in these different manners, none meet all four engineering principals for properly lubricating two metallic surfaces when they interface. The four engineering principals are (1) lubricating at the right location; (2) lubricating at the right time; (3) lubrication with the right lubricant; and (4) lubricating in the right amount. Further, such systems are configured to be installed, controlled and managed on an independent, individual basis, with no cross-management or control between them. Individual configurations, setups, and optimizing changes have to be applied to each of these single lubrication or friction modifier systems or equipment.

Therefore, transit authorities have to operate and monitor these systems individually, including maintenance tasks on each individual lubrication component, which is very time-consuming and costly. Optimizing and changes of lubrication strategies, operation modes or collecting fleet wide lubrication data involves visits to each single lubrication system, installed wayside or onboard to apply fleet-wide adjusting. Such optimization is not only costly, but also requires time and manpower, which most fleet operators do not have. Therefore, the adjustment/collection can take months or even years, to apply a fleet-wide change. Such measures are extremely inefficient, especially when considering fleet operations which receive new vehicles with onboard lubrication or a series of new wayside lubricators, which most likely have to be adjusted after the initial startup phase. Therefore, there is a need for a system and method to apply lubricants and other friction modifiers to the wheels and rails of a fleet of rail-based vehicles according to the four engineering principals. In addition, there is a need for a system that can centrally manage and monitor, control and optimize all lubricant controls and systems utilized by a fleet authority.

SUMMARY OF INVENTION

The present invention is a system and method for the control of applying lubrication to the wheels of a fleet of railed-based vehicles and the rails on which the railed-based vehicles travel.

In an aspect, wheel-rail lubrication and noise fleet management system is configured to analyze and optimize the application of wheel/rail lubrication within a whole fleet to the best possible efficiency. In an additional aspect, the wheel-rail lubrication and noise fleet management system is further configured to manage the noise created by the interaction between the wheels and rails of the whole fleet. In such aspects, the wheel-rail lubrication and noise fleet management system can monitor the real time results of the application of lubricant of rail-wheel systems that utilize the lubrication fleet management system.

In an aspect, the wheel-rail lubrication and noise fleet management system can control lubrication systems utilizing lubrication controllers. In an aspect, lubrication plans can be implemented for an entire wheel-rail fleet. In such aspects, the lubrication plans can be sent remotely from a fleet management server to all lubrication controllers of the wheel-rail fleet. In an aspect, an initial lubrication plan can be generated for a wheel-rail system by the wheel-rail lubrication and noise fleet management system. In such an aspect, a lubrication management application can generate a lubrication plan based upon various characteristics of the components of the wheel-rail fleet and specific properties of lubricants.

In an aspect, changes can be made to a lubrication plan from the fleet management server that can be sent remotely to all lubricant controllers. In an aspect, the lubrication controllers can monitor conditions of the rail-based vehicles, the rails, the lubrication systems, and the surrounding environment. In an aspect, the lubrication fleet management system can apply changes immediately in the case of certain events (e.g., weather, accidents, and performance of vehicles).

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

FIG. 6 is another schematic view of an onboard lubrication system and a lubrication controller of the system of FIG. 4 according to an aspect.

FIG. 13 is a block diagram of a lubricant profile according to an aspect.

FIG. 17 is a flow diagram of a method performed by components of the system according to an aspect.

FIG. 19 is a flow diagram of a method performed by components of the system according to an aspect.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
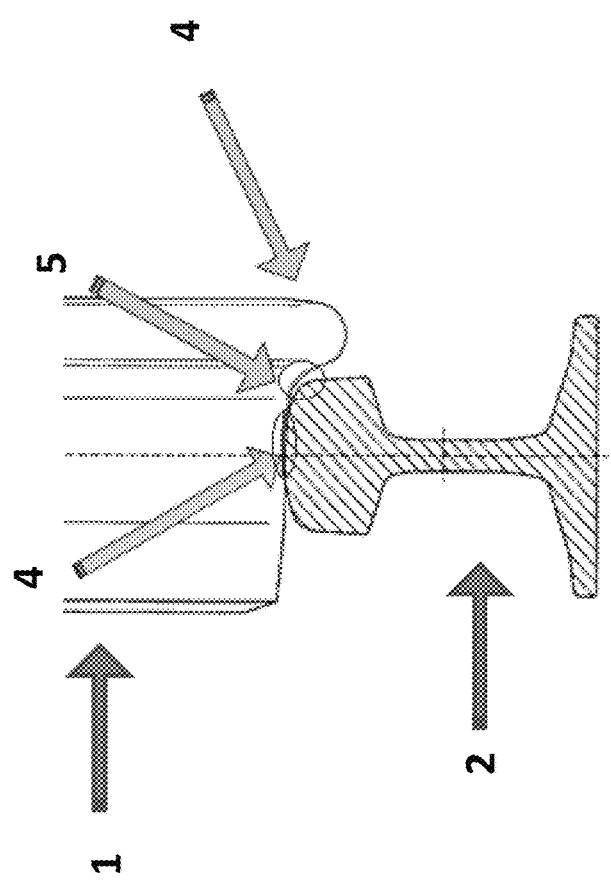
FIG. 1 is a cross-sectional view of a rail wheel and rail known in prior art.
Figure 2:
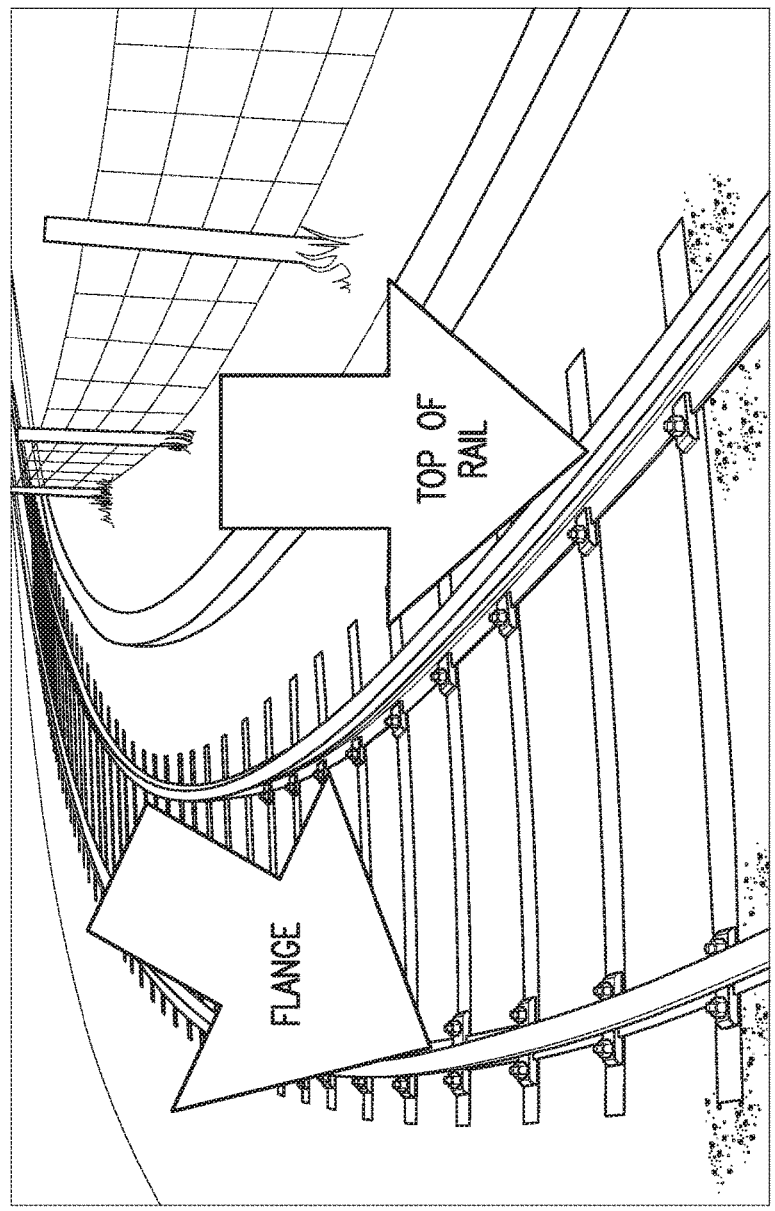
FIG. 2 is a view of a rail known in the prior art.
Figure 3:
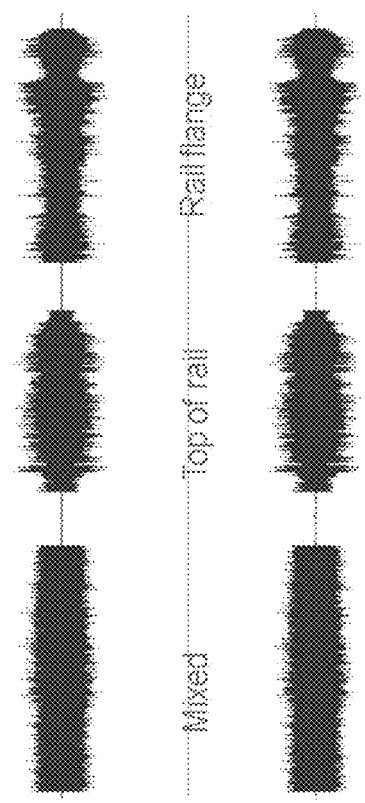
FIG. 3 is a schematic representation of curve squeaking known in the prior art.
Figure 4:
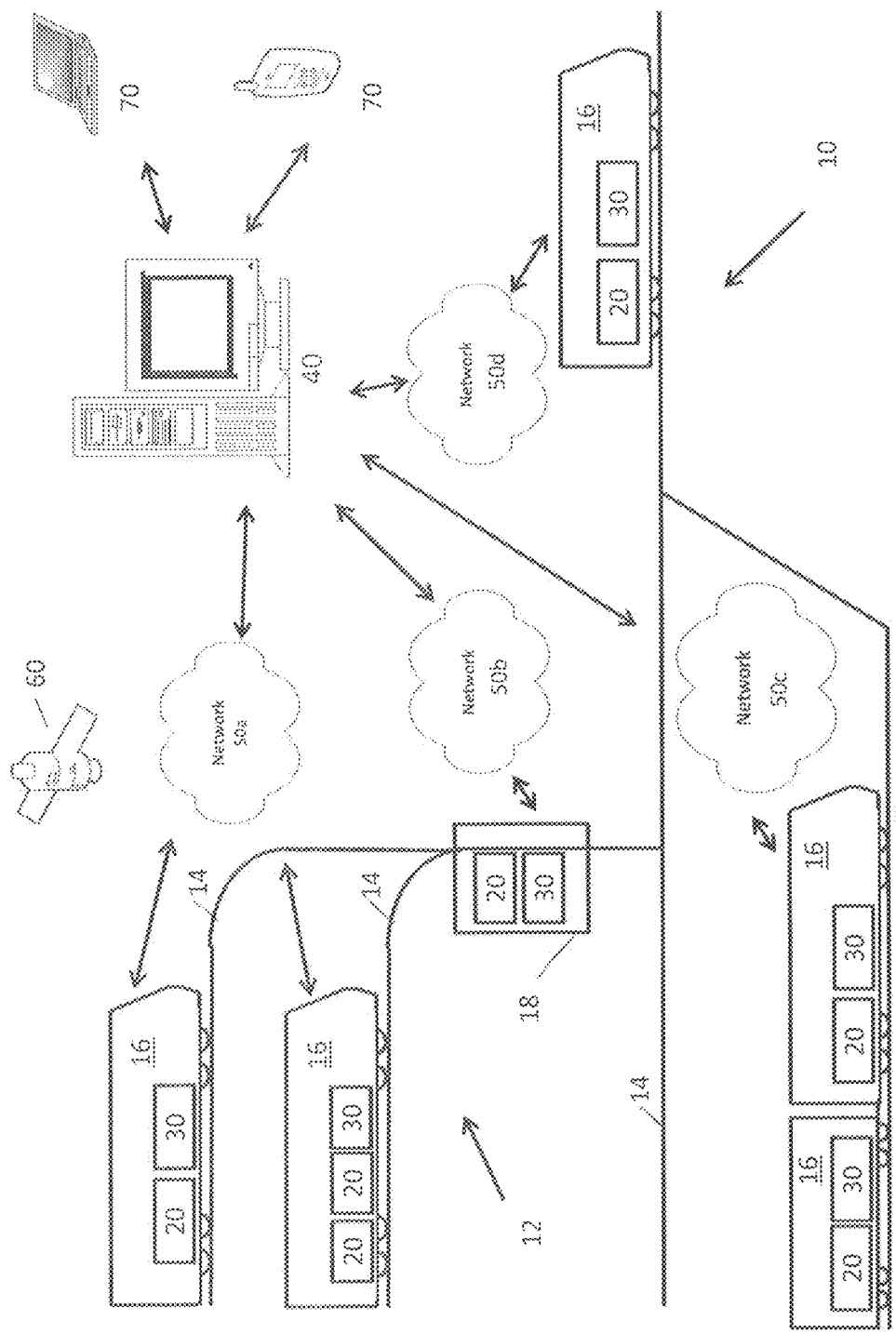
FIG. 4 is a schematic view of a lubrication fleet management system according to an aspect.

Referring to FIG. 4, the present invention is directed to a wheel-rail lubrication and noise fleet management system 10. The wheel-rail lubrication and noise fleet management system 10 assists in the application of lubricants to components of rail-wheel systems 12. In an aspect, the components of rail-wheel systems 12 can include rails/tracks 14, rail-based vehicles 16, and stationary waysides 18. The wheel-rail lubrication and noise fleet management system 10 includes lubrication systems 20. The lubrication systems 20 can be found at locations along the rails 14, on rail-based vehicles 16, and stationary waysides 18, and can be configured to apply lubrication to the various rail and wheel components. In an aspect, a rail-based vehicle 16 can have more than one lubrication system 20, as shown in FIG. 4. The different lubrication systems 20 found on the same rail-based vehicle 16 can perform different lubricant applications, with one in control of TOR application and the other in control of wheel/flange application.

The lubrication systems 20 are controlled by lubrication controllers 30. In an aspect, the lubrication controllers 30 can communicate with other components of the rail-wheel systems 12, discussed further below. The lubrication controllers 30 can also communicate with a central fleet management server 40. In an aspect, the central fleet management server 40 can manage the lubrication systems 20 through the lubrication controllers 30. The central fleet management server 40 can send commands and receive information from the lubrication controllers 30. In an aspect, the central fleet management server 40 can be accessed centrally or remotely by remote devices 70, discussed in further detail below. In an aspect, the communication between the central fleet management server 40 and the lubrication controllers occurs over a network 50. In an aspect, the network 50 can comprise multiple networks 50a, 50b, 50c, and 50d. Such networks 50 can include cell networks or the like, and are discussed in more detail below. In an aspect, the lubrication controllers 30 can be configured to communicate with GPS satellites 60, or any other type of location determining apparatus or application.

The wheel-rail lubrication and noise fleet management system 10 can be utilized by all types of rail-wheel systems 12. As discussed above, the rail-wheel systems 12 include rail 14 on which rail-based vehicles 16 travel. The type of rail 14 can determine what type of rail-based vehicles 16 are utilized by the rail-wheel systems 12. In an aspect, rail-wheel systems 12 can include, but are not limited to, rail freight, street car, light rail, metro, high speed, and commuter rail-wheel systems 12 (Such rail-wheel systems 12 can include a variety of rail-based vehicles 16, including, but not limited to, streetcars, light-rail, passenger, commuter, and high speed rails vehicles, engines, and freight cars). In an aspect, the rail-wheels systems 12 can include any type of system that uses a combination of rails and wheels. For example, such systems 12 can also include container-crane systems that can be found at rail yards and ports, escalator systems, automated moving systems, roller-coasters, and the like. In addition, the rail-wheel systems 12 can utilize a variety of stationary waysides 18. The stationary waysides 18 can include, but are not limited to, top of the rail, side of the rail, or combination of both waysides 18.

Figure 5:
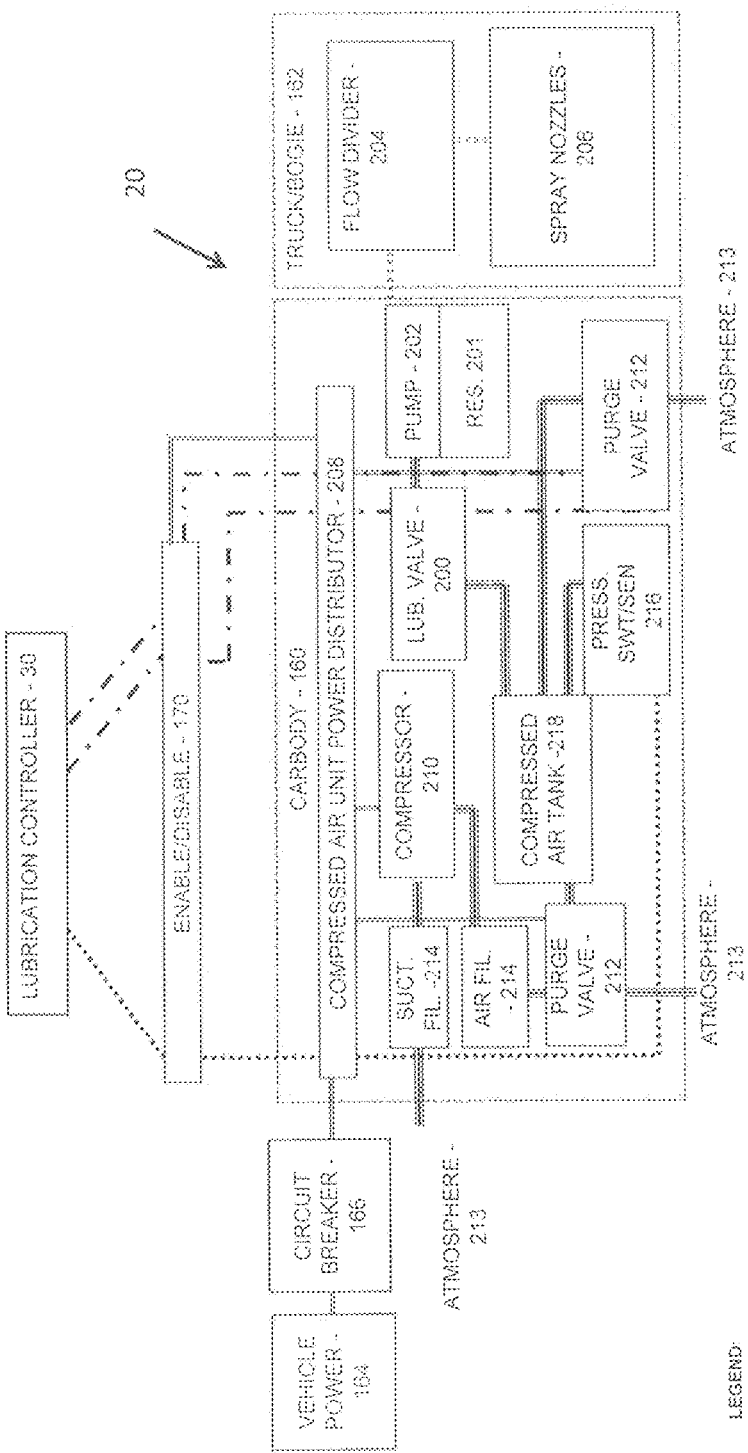
FIG. 5 is a schematic view of an onboard lubrication system and a lubrication controller of the system of FIG. 4 according to an aspect.
Figure 8:
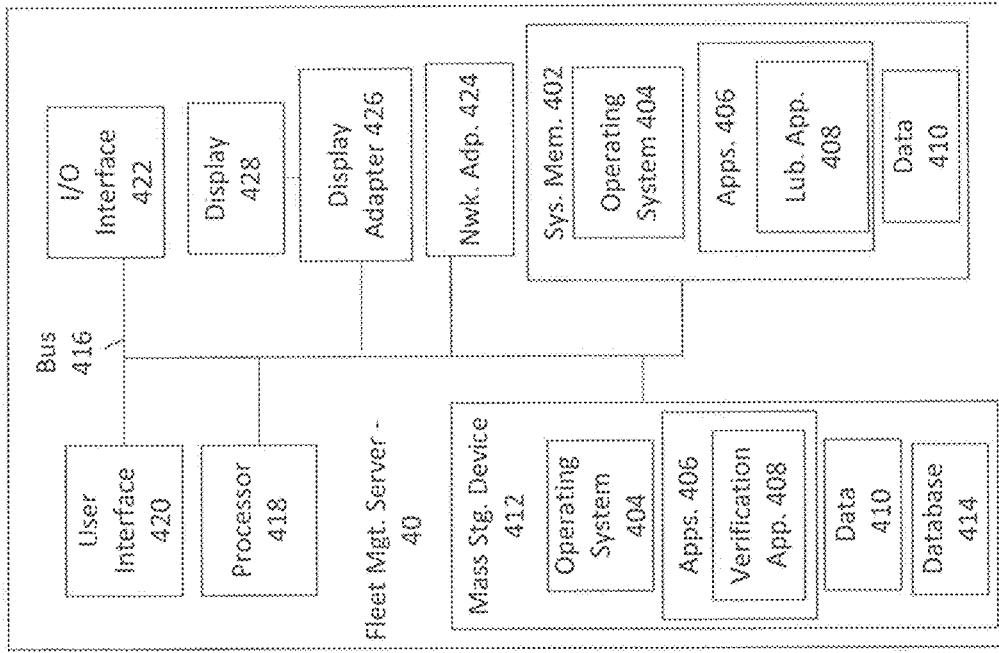
FIG. 8 is a schematic view of a server of the system of FIG. 4 according to an aspect.

In an aspect, as shown in FIGS. 4, 5 and 5A, the wheel-rail lubrication and noise fleet management system 10 can include lubrication systems 20 controlled by the lubrication controller 30. The wheel-rail lubrication and noise fleet management system 10 can use a variety of lubrication systems 20. In an aspect, the wheel-rail lubrication and noise fleet management system 10 can be used with lubrication systems 20 configured for use with rail-based vehicles 16 and stationary waysides 18. In an aspect, the wheel-rail lubrication and noise fleet management system 10 can be configured to use lubrication systems 20 that are known in the art. For example, the lubrication management system 10 can use Igralub lubrication systems, other rail-approved lubrication systems, including, but not limited to, lubrication systems from REBS, Delimon, and SKF. In an aspect, the lubrication management system 10 can utilize a lubrication system as disclosed in U.S. Pat. No. 4,711,320, incorporated herein by reference.

In as aspect, the lubrication systems 20 can include lubricant containers, dosage pumps, spray-nozzles, and solenoid valves used to house and control the dispersement of a lubricant. In an aspect, the lubrication systems 20 can also include sensors that are normally associated with lubrication systems 20, including, but not limited to curve sensors, ambient temperature sensors, accelerometers, and distance/speed sensors. In another aspect, the sensors discussed above can be separate from the lubrication systems 20, but associated with components of the rail-wheel system (e.g., the rail-based vehicles, rail, and/or stationary waysides). In an aspect, the lubrication systems 20 can include a friction modifier (e.g., friction modifier sticks) and other components that are associated with wheel conditioning.

In an aspect, a sanding system can be associated with the lubrication system 20. The sanding system can be utilized when more friction at the rail/wheel interface by dispersing sand or other firction-creating substances onto the rails 2 to create friction with the wheels 1. For example, the sanding system can be activated when an emergency stop is necessary, or when the rail-based vehicle 16 is experiencing a loss in friction, which can be detected if such sensors are installed and enabled within the wheel-rail lubrication and noise fleet management system 10.

FIGS. 5-6 illustrate components of a lubrication system 20 according to an aspect. The lubrication system 20 can be found on numerous positions within a rail-based vehicle 16. For example, as shown in FIG. 5, components of the lubrication system 20 can be located within the car-body 160 and the trucks/bogies 162 of the rail-based vehicle 16. The lubrication system 20 can also be configured to receive power from the power source of the rail-based vehicle 164, which can be controlled by a circuit breaker 166. The lubrication system 20 can include a lubrication valve 200, which can be connected to a lubricant reservoir 201 and metering pump 202. The lubricant reservoir and metering pump 202 can be connected to flow dividers 204 and spray nozzles 206 that apply the lubricant at the desired location. The spray nozzles 206 can be placed based upon the needed application(s) (e.g., top of rail or wheel flange) on the truck/bogies 162 accordingly. The lubrication system 20 can also include a compressed air unit power distributor 208, a compressor 210, purge valves 212 that have access to ambient atmosphere 213, filters 214 (e.g., suction and airline), pressure switches/sensors 216, and a compressed air tank 218.

In other aspects, the lubrication system 20 can contain other components, including, but not limited to a sanding system and independent friction modifiers (e.g., sticks and the like). The sanding system may be one known in the art, and controlled for operation in a manner similar to the lubrication system 20. Further, while the lubrication system of FIG. 5 is illustrated in use on a rail-based vehicle 16, the wheel-rail lubrication and noise fleet management system 10 of the present invention is also configured to control lubrication systems 20 associated with stationary waysides 18. Accordingly, such lubrication systems 20 can include the needed components to ensure operation at stationary waysides 18.

As shown in FIGS. 4-7, the rail lubrication fleet management system 10 includes lubrication controllers 30. The lubrication controllers 30 are configured to control the lubrication systems 20. In an aspect, the lubrication controllers 30 are configured to control the lubrication systems 20 as allowed and required by the operating systems of the wheel-based vehicle 16 or wayside station 18.

In an aspect, as shown in FIG. 6, the lubrication controller 30 is configured to be integrated into the systems of the rail-based vehicle 16. For example, the lubrication controller 30 can be configured to connect and utilize the vehicle power supply 164 of the rail-based vehicle 16. The lubrication controller 30 can also utilize a power supply unit 330. In addition, the lubrication controller 30 can be connected to various sensors and devices 172 that can provide valuable information to the controller 30. Such sensors can include those discussed above in addition to others. Also, the devices 172 can include other controls and loads of the rail-based vehicle 16. In addition, the vehicle controller 30 can also be connected to a bus 174 of the rail-based vehicle 16. The connection to the bus 174 allows the controller 30 to utilize the communication means available on the rail-based vehicle 16 if needed. In addition, the bus 174 can provide a connection to network connections and other components of the rail-based vehicle 16, including, but not limited to, GPS antennas utilized by global positioning systems, and or other location determination technologies used in modern train-localization methods (e.g., Fahrleit-Systeme, Train Control").

In an aspect, the controller 30 can be connected to the lubrication system 20 through interface relays and feedback connections 176 associated with the rail-based vehicle 16. Also, the rail-based vehicle 16 can also control when the lubrication controller 30 can operate the lubrication systems 20 to apply the lubricant through an enable/disable component 178. The enable/disable component 178 can ensure that the lubrication controller 30 has clearance to operate the lubrication system 20. For example, if the rail-based vehicle 16 experiences an emergency breaking situation, or is offloading passengers at a train station, the relays 176 between the lubrication system 20 and the lubrication controller 30, which can be supplied by the rail-based vehicle 18, can be cut-off by the enable/disable component 178 of the rail-based vehicle 16. In an aspect, the enable/disable component can selectively cut-off the relays 176 only from the lubrication controller 30, and not to other controlling mechanisms employed by the rail-based vehicle 16 to activate components of the lubrication system. For example, returning to the emergency braking example, another controlling mechanism can activate the sanding system when needed. While the integration above is discussed in terms of being integrated into the various systems of a rail-based vehicle 16, it should be understood that integration can apply as equally to stationary waysides 18 and its relevant components according to aspects of the present invention.

Figure 7:
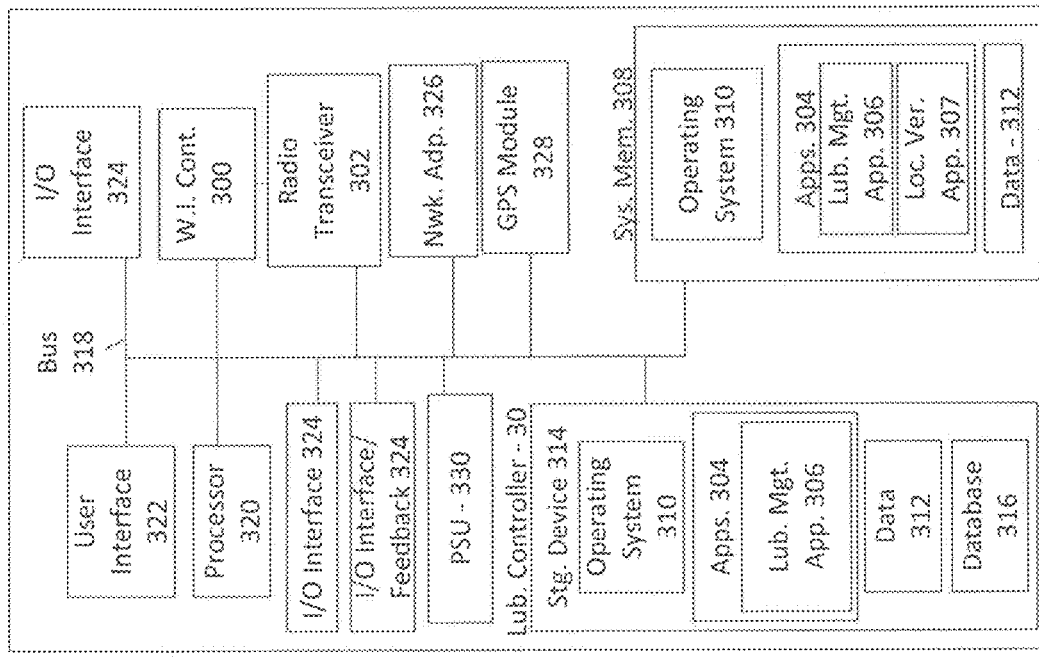
FIG. 7 is a schematic view of a lubrication controller of the system of FIG. 4 according to an aspect.

According to an aspect, as shown in FIG. 7, the lubrication controller 30 includes a combination wireless interface controller 300 and radio transceiver 302. The wireless interface controller ("W.I. Cont.") 300 is configured to control the operation of the radio transceiver 302, including the connections of the radio transceiver 302, as well as the receiving and sending of information from the central fleet management server 40 via the network 50 discussed in more detail below. In one aspect, the wireless interface controller 300 and radio transceiver 302 can be contained within the lubrication controller 30, or can be associated with the component of the rail system 10 to which the lubrication controller 30 is dedicated (e.g., the communication system of the rail vehicle).

The radio transceiver 302 may communicate on a wide range of public frequencies, including, but not limited to, frequency bands 2.4 GHz and/or 5 GHz-5.8 GHz. In addition, the radio transceiver 302, with the assistance of the wireless interface controller 300, may also utilize a variety of public protocols. For example, in some embodiments of the present invention, the combination wireless interface controller 300 and radio transceiver 302 may operate on various existing and proposed IEEE wireless protocols, including, but not limited to, IEEE 802.11b/g/n/a/ac, with maximum theoretical data transfer rates/throughput of 11 Mbps/54 Mbps/600 Mbps/54 MBps/1 GBps respectively. In an aspect, the wireless interface controller 300 and the radio transceiver 302 of the lubrication controller 30 are configured to send and receive data at the same time.

In an aspect, the radio transceiver 302 can include a wireless cellular modem 302 configured to communicate on cellular networks 50. The cellular networks 50 can include, but are not limited to, GPRS, GSM, UMTS, EDGE, HSPA, CDMA2000, EVDO Rev 0, EVDO Rev A, HSPA+, WiMAX, LTE, and the like.

The lubrication controllers 30 may have one or more software applications 304, including a lubrication management application (Lub. Mgt. App.) 306 and a location verification application 307 (Loc. Ver. App.). In an aspect, the lubrication management application 306 controls the lubrication system 20 and the application of lubrication to the components of the associated rail systems 12. The lubrication controllers 30 includes system memory 308, which can store the various applications 304, including, but not limited to, the operating system 310 of the lubrication controller 30 and the lubrication management application 306. The system memory 308 may also include data 312 accessible by the various software applications. The system memory 308 can include random access memory (RAM) or read only memory (ROM). Data 312 stored on the lubrication controller 30 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, Linux data storage means, and the like.

The lubrication controller 30 can include a variety of other computer readable media, including a storage device 314. The storage device 314 can be used for storing computer code, computer readable instructions, program modules, various databases 316, and other data for the lubrication controller 30, and the storage device 314 can be used to back up or alternatively to run the operating system 310 and/or other applications 304, including the file lubrication management application 306. In an aspect, one of the databases 316 of the lubrication controller 30 can store lubrication commands and/or lubrication plan profiles, discussed in detail below. The storage device 314 may include a hard disk, various magnetic storage devices such as magnetic cassettes or disks, solid-state flash drives, CD-ROM, DVDs or other optical storage, random access memories, and the like.

The lubrication controller 30 may include a system bus 318 that connects various components of the lubrication controller 30 to the system memory 308 and to the storage device 314, as well as to each other. Other components of the lubrication controller 30 may include one or more processors or processing units 320, a user interface 322, and one or more input/output interfaces 324. In an aspect, at least one of the input/output interfaces 324 is configured to connect with the lubrication system 20. In such an aspect, the connection with the lubrication system 20 can include connections to a spray nozzle and solenoid valves, as well as any sensors associated with the lubrication system 20 or the rail-wheel systems 12. In another aspect, the input/output interfaces 324 can also be configured to connect with other sensors that are associated with the component of the rail system 12 to which the lubrication system 20 is dedicated. In another aspect, the input/output interfaces 324 can be configured to connect to other components, including additional control systems of the rail system components. In such an aspect, the input/output interface 324 can provide connections to the vehicle controls of a train vehicle, the propulsion system, microphone systems, the communication systems of the components, and the like.

The input/output interfaces 324 are configured to allow the lubrication controller 30 to receive signals from various sensors and systems associated with the wheel-rail system 12. For example, such signals can provide information related to, but not limited to, speed of the rail-based vehicle 16, lubricant levels in the lubricant tanks 201, slip/slide information from a vehicles propulsion system, noise recordings from microphone systems for determining the types of noises created by interactions between wheels and rails by various forces, the direction of the vehicle, weather conditions, and the like. In addition, the signals can include information related to the experiences of the trains, including, but not limited to, doors opening, the application of emergency brakes, ambient temperature, directional heading of the vehicle, errors performed by the lubrication systems, lubrication controllers, and the rail-wheel vehicle, and the like. The signals provided can include any information that is useful in the lubrication management of the rail-based system 12.

In addition, the lubrication controller 30 may include a network adapter 326 configured to communicate with other devices over various networks. In an aspect, the lubrication controller can include a GPS module 328 to obtain the location information of the lubrication controller 30 and rail-based vehicle 16 on which it is found. The GPS module 328 is configured to be connected to a GPS antenna, which communicates with the GPS satellites 60. In an aspect, the lubrication controller 30 can be configured to contain the GPS module 328 and antenna. In another aspect, the GPS module 328 and antenna can be associated with the rail-based vehicle 16 and configured to be connected to the lubrication controller 30.

The lubrication controller 30 includes a power source unit 330. In an aspect, the power source 330 can be provided by the rail-based vehicle 16 or stationary wayside 18 to which the lubrication controller 30 is dedicated. In another aspect, the power source 330 can be included within the lubrication controller 30. For example, the self-contained power source 330 can be utilized when there is a safety concern with having the lubrication controller 30 being attached to the power source of the rail system component or there is no such additional power source available.

As shown in FIGS. 4 and 7, the wheel-rail lubrication and noise fleet management system 10 may include a central fleet management server 40. Referring to FIG. 7, the central fleet management server 40 may have several applications 406, including, but not limited to, a fleet lubrication application 408 that corresponds to the lubrication management application 308 of the lubrication controller 30. The central fleet management server 40 and its applications 406 may utilize elements and/or modules of several nodes or servers. In any event, the central fleet management server 40 should be construed as inclusive of multiple modules, software applications, servers and other components that are separate from the lubrication controllers 30.

The central fleet management server 40 includes its own system memory 402, which stores the operating system 404 and various software applications 406, including the lubrication application 408. The central fleet management server 40 may also include data 410 that is accessible by the software applications 406. The central fleet management server 40 may include a mass storage device 412. The mass storage device 412 is configured to store data associated with the components of the wheel-rail system 12, the lubrication system 20, and the lubrication controllers 30 of the overall system 10, discussed in more detail below. In addition, the mass storage device 412 can be used for storing computer code, computer readable instructions, program modules, various databases 414, and other data for the central fleet management server 40. The mass storage device 412 can be used to back up or alternatively to run the operating system 404 and/or other software applications 406, including the lubrication application 408. The mass storage device 412 may include a hard disk, various magnetic storage devices such as magnetic cassettes or disks, solid state-flash drives, CD-ROM, DVDs or other optical storage, random access memories, and the like.

The central fleet management server 40 may include a system bus 416 that connects various components of the central fleet management server 40 to the system memory 402 and to the mass storage device 412, as well as to each other. In an aspect, the mass storage device 412 can be found on the same server 40. In another aspect, the mass storage device can comprise multiple mass storage devices 412 that are found separate from the central fleet management server 40. However, in such aspects the central fleet management server 40 can be provided access.

Other components of the central fleet management server 40 may include one or more processors or processing units 418, a user interface 420, an input/output interface 422, and a network adapter 424 that is configured to communicate with other devices, including, but not limited to, the lubrication controllers 30 and the components of the rail system 12. The network adapter 424 can communicate over various networks 50. In addition, the central fleet management server 40 may include a display adapter 426 that communicates with a display device 428, such as a computer monitor and other devices that present images and text in various formats. A system administrator can interact with the central fleet management server 40 through one or more input devices (not shown), which include, but are not limited to, a keyboard, a mouse, a touch-screen, a microphone, a scanner, a joystick, and the like, via the user interface 418. In an aspect, for the end users, respectively operators of wheel-rail based vehicles 16, the fleet wheel/rail lubrication and noise management system 10 will be delivered and installed as a fully web-enabled and web-hosted application hosted by central fleet management server 40. The web-enable and web-hosted application can be accessed by remote devices 70 through the various networks 50 available to the end users.

Figure 9:
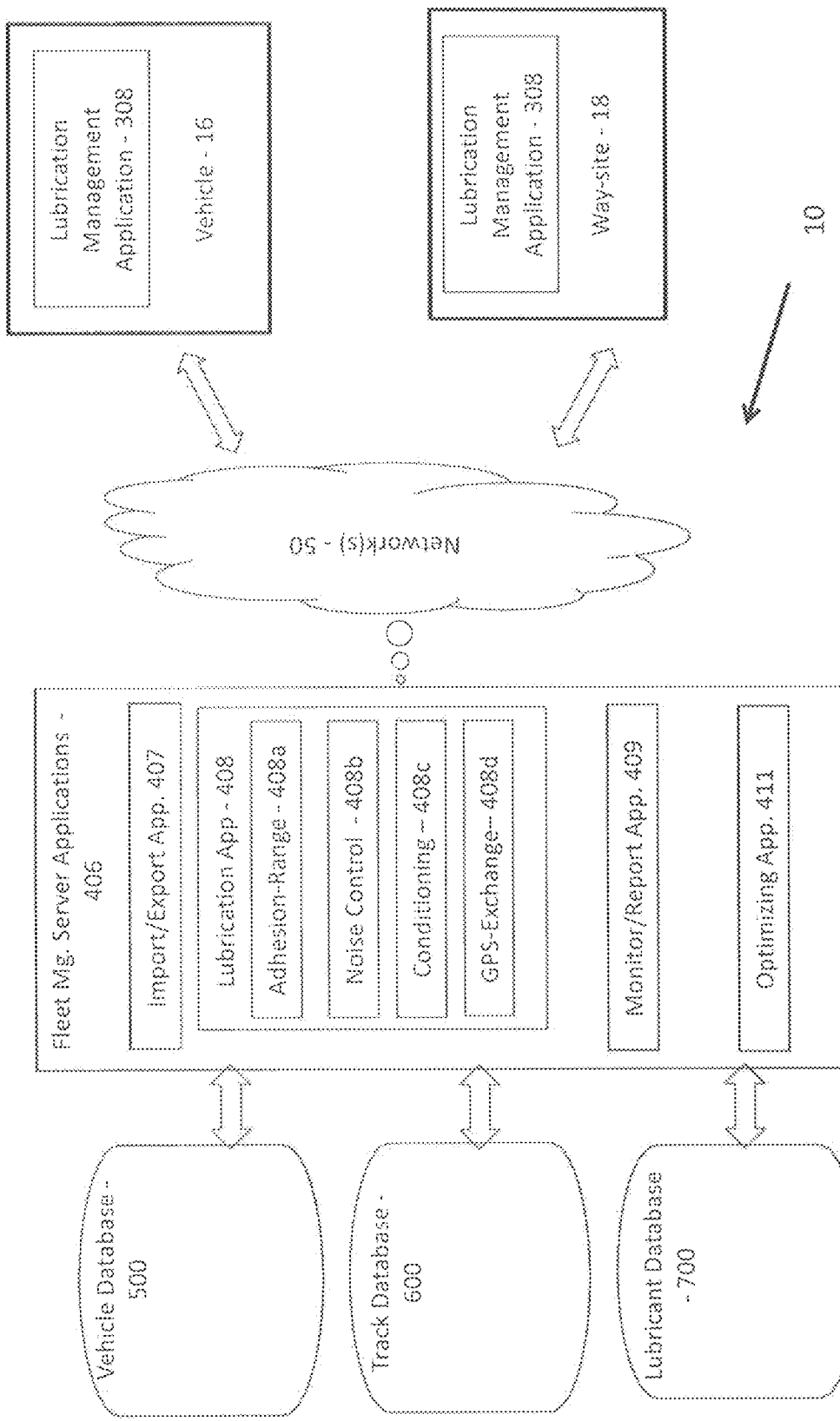
FIG. 9 is a schematic view of components of the system according to an aspect.
Figure 10:
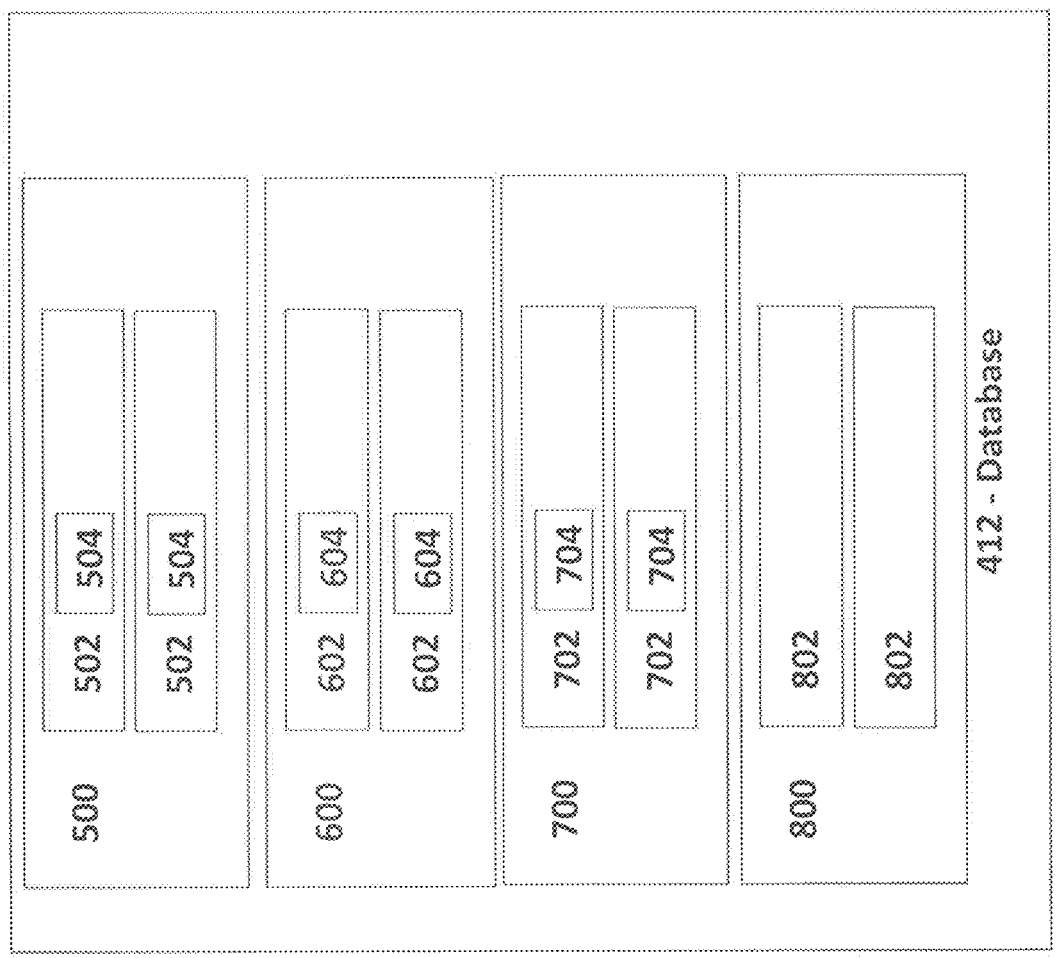
FIG. 10 is a schematic view of a database according to an aspect.

In an aspect, the various databases 414 of the central fleet management server 40 can include a vehicle database 500, a track database 600, a lubricant database 700, and a lubrication plan database 800 (discussed in more detail below), as illustrated in FIGS. 9-10. The vehicle database 500, track database 600, and lubricant database 700 can contain relevant properties of the various components of the fleet lubrication operating system 10 from which the lubrication application 408 requests and updates information used in the control of the lubrication controllers 30.

The vehicle database 500 contains information relevant to the rail-based vehicles 16 utilized by the rail-wheel system 12. For example, the vehicle database 500 can include information related to the vehicles 16, including, but not limited to, the types of vehicles and their number, the type bogies used by individual vehicles, the wheel type and wheel properties for the individual vehicles, the maintenance record of each vehicle, the power voltage associated with the rail-based vehicle 16, the amount traveled by the vehicle per year, the life expectancy of the vehicle, including its components (e.g., wheels, couplers, etc.), the performance characteristics of the vehicles, the lubrication systems 20 used by each vehicle, the type of and amount remaining of the lubricant with each lubrication system, level of compressed air, the lines or engines to which the vehicle/car is assigned, performance specification and limitations, and other similar information.

Figure 11:
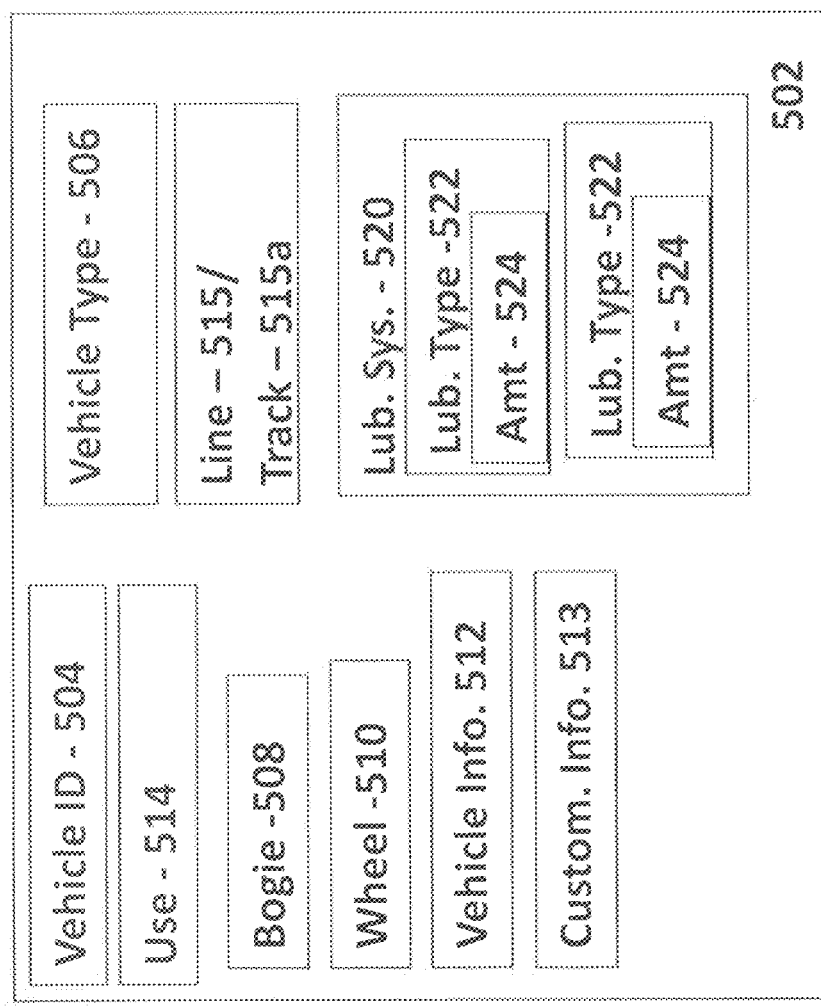
FIG. 11 is a block diagram of a vehicle profile according to an aspect.

In an aspect, the vehicle database 500 can contain vehicle profiles 502 of the vehicles 16 associated with the rail-wheel system 12 that utilizes the fleet management system 10. In an aspect, as illustrated in FIG. 11, a vehicle profile 502 can include a vehicle identifier 504. The vehicle identifier 504 is used to identify an individual rail-based vehicle 16. The vehicle profile 502 can also include a vehicle type identifier 506. The vehicle type identifier 506 identifies the type of rail-based vehicle 16. For example, the vehicle type identifier 506 would identify the individual rail-based vehicle 16 associated with the vehicle identifier 504 as an engine, freight car, and the like. The vehicle type identifier 506 of the vehicle profile 502 can include the vehicle type information directly, or can use a vehicle type identifier 506 to call upon a vehicle type database to obtain the information.

The vehicle profile 502 can also include other types of relevant rail-based vehicle, including, but not limited to, a bogie identifier 508, and a wheel-type identifier 510. A wheel-type identifier 510 can indicate that type of wheel and wheel-rail profile being utilized, with each wheel type having different worn profiles and maintenance intervals that can be used to optimize the performance and maintenance of the rail-based vehicles 16. The profile 502 can include other information 512 of the vehicle 16. Such information 512 can include, but is not limited to, the maintenance history of the vehicle, the miles traveled by the vehicle, the weight of the vehicle, the performance specifications of the vehicle (e.g., weight limits, speed limits, etc.), and the like. In addition, the profile 502 can also include custom information 513, allowing an administrator to create an additional field to capture information that can be fleet-specific, such as last wheel/rail interface reprofiling, assigned maintenance facility, maintenance schedule information etc.

The vehicle profile 502 can also include a use identifier 514 which indicates whether or not the vehicle 16 is actually in use. Further, the profile can include a line identifier 515, which identifies which route/train to which the vehicle 16 has been assigned. The line identifier 515 can also include a track identifier 515a that identifies what track 14 the rail-based vehicle 16 is on. In an aspect, the profile 502 can also include a location identifier 516, which can use GPS coordinates or the like.

In an aspect, the vehicle profile 502 can also include information related to the lubrication system 20 found on the vehicle 16. The information related to the lubrication system can include, but is not limited to, the type(s) of lubrication system(s) 20 on the vehicle (520) (e.g., a rail-based vehicle 16 can include a top of the rail lubrication system and a wheel flange lubrication system), the type of lubrication(s) (522) used by the lubrication system 20, the amount of the lubrication (524) currently available for use by the lubrication system 20, the amount of lubricant that a lubrication system 20 can apply in a given cycle, and the status of the lubrication system 20 and controller 30 (e.g., whether the two have experienced errors, etc.).

Figure 12:
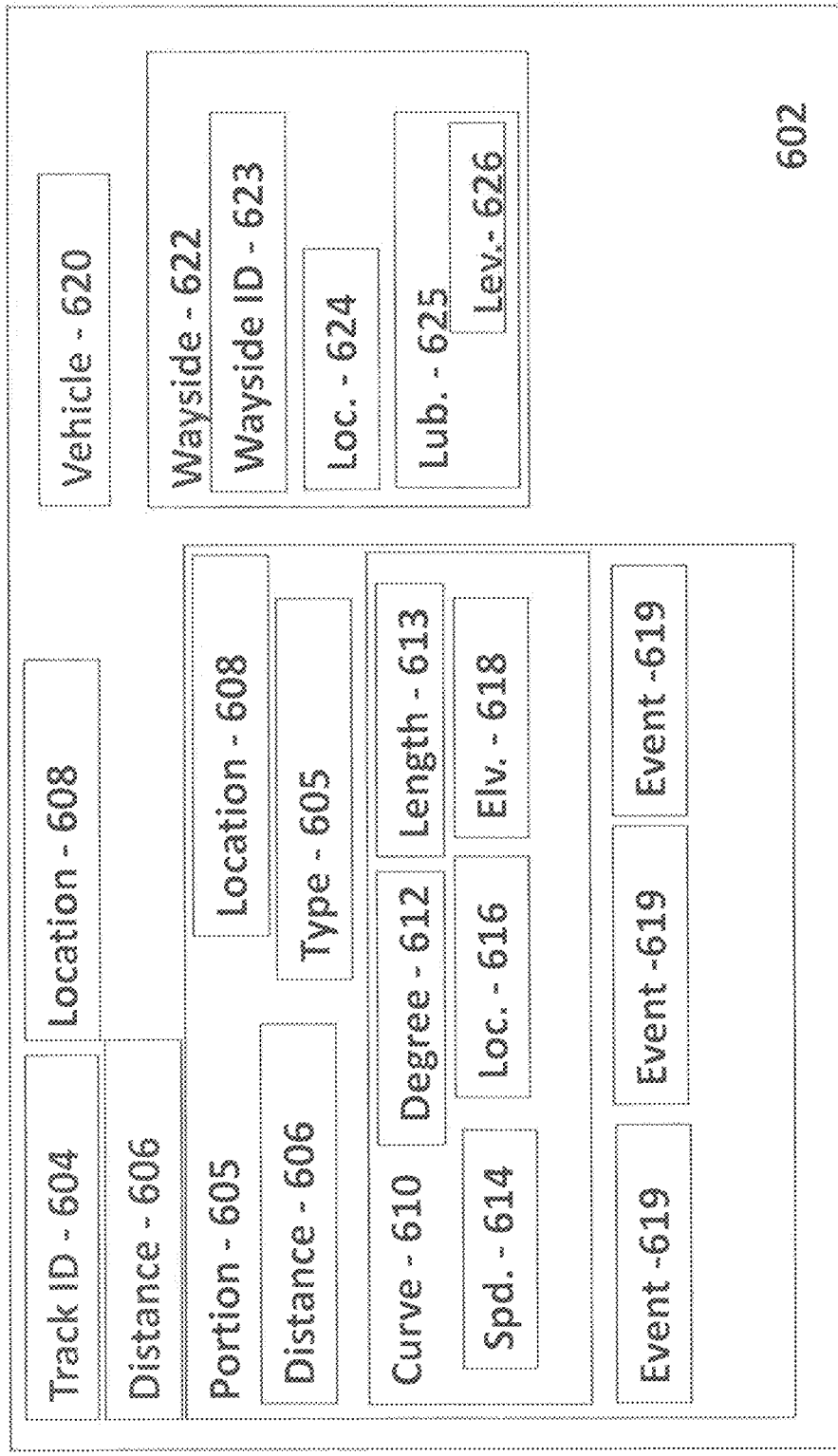
FIG. 12 is a block diagram of a track profile according to an aspect.

Referring to FIG. 12, the track database 600 can retain information regarding the tracks/rail 14 used by the rail-wheel system 12. In an aspect, the information can include certain characteristics of the track, such as the location of the track, the length of the track, the type of rail, type of track (e.g., guard rail, check rail, turnouts, frogs, cog rails, etc.), the curvature of the track, including the length and degree of the curve along sections, the elevation and change in elevation of the track along sections, locations and lengths of where the track goes through tunnels or stations, locations and lengths of where the track is used by different vehicle types, the location of switches, frogs, the location(s) of stationary wayside lubrication systems 16, the type(s) and amount of lubricant available for use by the stationary way-side lubrication system 16, and other relevant information.

In an aspect, the track database can include track profiles 602. As illustrated in FIG. 12, the track profiles 602 can include a track identifier 604 which can be used to identify a specific track 14 used by the rail-wheel system 10. In an aspect, the track profile 602 can also include track portion sections 605. The track profile 602 can include the distance 606 of the track 14 and the location 608 of track. The location 608 can be defined by using GPS coordinates. In an aspect, the track profiles 602 can be formed of individual track portions, or a profile 602 can contain information specifically for each identified portion of the track 14.

The track profile 602 can also include other characteristics of the track 14. In an aspect, the track profile 602 can include a curve section indicator 610, which can include the degree of the curve 612 at a section of the track 14, the length 613 of the curve at that given degree 612, the speed range 614 of a section of track that which a rail-based vehicle can safely travel, and the location 616 of the curve. In addition, the curve section indicator 610 can also include the elevation 618 of the particular section. The profile 602 can also include event elements 619 that are associated at given sections 605 of the track 14. For example, the event elements 619 can include curve squeak indicators (e.g., complaints about squeaks, remarks from specialists to certain track sections), known adhesion problem areas, the presence of tunnels, and the like. The event elements 619 themselves can also include information related to their location as well.

In an aspect, the track profile 602 can also include a vehicle type indicator 620 which identifies the type(s) of vehicles that use the track and at what locations. In an aspect, the track profile 602 can also include stationary wayside sites elements 622, which can identify a specific stationary wayside site 623, its location 624, the type(s) of lubrication controller(s) 30 being used at that location 625, and the type and amount of lubricant available 626 to the lubrication controller.

Looking to FIG. 13 and Table 1 below, the lubricant database 700 can retain information regarding the types of lubricants being used by the lubrication systems 20 of the rail-wheel system 12. The lubricant database can include the types of lubricants used by the rail-wheel, the physical properties of the lubricant(s), such as the chemical composition, the materials for which the lubricant best reacts, the optimal temperature range of the lubricant, and the like. In addition, the costs, name of the manufacturer, and the amount of in which the lubricant can be purchased can also be retained by the lubricant database. For example, the properties and characteristics that can be kept by the lubricant database for a given lubricant can include, but are not limited to, the following properties shown in Table 1 below.

TABLE 1

| | |
|---|---|
| 1 | MSDS Location |
| 2 | Form: |
| 3 | Color: |
| 4 | Odor: |
| 5 | NLGI |
| 6 | Biodegradable |
| 7 | Biodegradable Certificate |
| 8 | Solid Content |
| 9 | Solid Content % |
| 10 | Transport Information |
| 11 | Packaging-Type |
| 12 | Packaging-Unit |
| 13 | Density at 20° C.: |
| 14 | Realitve Density |
| 15 | Vapour Density |
| 16 | Evaporation Rate |
| 17 | Solubility in Water: |
| 18 | Pour Point |
| 19 | Drip Point |
| 20 | Viscosity at 20° C.: |
| 21 | Viscosity at 0° C.: |
| 22 | Viscosity at −5° C.: |
| 23 | Penetration at 25° C.: |
| 24 | Dropping point: |
| 25 | Flash point: |
| 26 | Solubility in water: |
| 27 | Decomposition point: |
| 28 | Solvent content: |
| 29 | Organic Solvents |
| 30 | Solvent Water |
| 31 | Toxity Class |
| 32 | Toxic on Skin |
| 33 | Toxic on Eye |
| 34 | Water Hazard Class |
| 35 | Waste Disposal |
| 36 | Custom Property 1 |
| 37 | Custom Property 2 |
| 38 | Custom Property 3 |
| 39 | Custom Property 4 |
| 40 | Custom Property 5 |
| 41 | Custom Property 6 |
| 42 | Application/Manuf. |

As shown above in Table 1, the known physical properties of the lubricant can also include custom properties. In an aspect, the custom properties can include specific performance information that is known for the lubricant. The specific performance information can include information about a specific lubricant or known requirements for application of lubricants based upon the characteristics of the track (curvature, length, switches present, etc.), the vehicle (speed), and environmental conditions (temperature, precipitation). For example, 1 $cm^3$ of lubricant A can be good for a 20 m curve, lubricant B for a 50 m curve, and lubricant C for a 150 m curve. In another example, a 2° curve high rail of 50 m can need X $cm^3$ of a specific lubricant, whereas a 3° curve of 150 m needs 3X $cm^3$ of the same lubricant. In another example, switch D may need to have lubricant A applied 20 m prior to a curve, whereas switch F needs lubricant A applied 50 m prior to a curve. In another example, a specific lubrication system 20 needs to apply lubricant B once every 50 m when the vehicle is traveling at 50 km/h, whereas a different lubrication system 20 needs to apply lubricant B twice every 50 m when the vehicle is traveling at 40 km/h. The specific performance information is not limited to the examples listed above. The specific performance information can include any known or unknown characteristic of a specific lubricant in different applications and conditions. The specific performance information can be updated and added to for each lubricant at any time.

In an aspect, the lubricant database 700 can include lubricant profiles 702. As illustrated in FIG. 13, the lubricant profiles 702 can include a lubricant identifier 704 which can be used to identify a specific lubricant used by or available to the rail-wheel system 12. The lubricant profile 702 can also include physical properties 706 (e.g., chemical components, form, color, odor, etc.), commercial properties 708 (costs, unit size, supplier, etc.), and specific performance properties 710, which can include the parameters under which the specific lubricant should be optimally used. For example, the specific performance information elements 710 can include the temperature ranges in which the lubricant can be used, whether or not the lubricant is effective in rainy, snowy, windy, or dry conditions, whether the lubricant is effective with certain types of axle weight, for wheel-flange or top of rail application or can be used for certain types of waysides 18 or rail-based vehicles 16, whether the lubricant is effective for rail in curves of a certain length, degree, elevation, and other influencing factors, whether the lubricant is effective at a given speed, and other similar types of performance parameters.

The wheel-rail lubrication and noise fleet management system 10, utilizing the components and information described above, can create lubrication plans to be applied uniformly across a fleet, optimize such plans based upon the demands of the fleet, and continuously monitor and control the lubrication of the rail-based vehicles 16 and rails 14 based upon the real-time conditions. In an aspect, the central fleet management server 40, using the information organized and contained within the vehicle database 500, the track database 600, and the lubricant database 700, as well as information continuously received and updated from the lubrication controllers 30, can formulate commands to be delivered to the lubrication controllers 30 for application, by the lubrication systems 20, of the optimal lubricant in the right amount at the right location at the right time. In an aspect, as shown in FIG. 9, the lubrication application 408 can utilize the vehicle, track, and lubricant databases 500, 600 and 700 to develop such lubrication plans that are sent over various networks 50 (e.g., Wi-Fi, GSM, 4G LTE, and rail-based communication systems) to then be implemented by the lubrication management application 308 of the controllers 30 at the rail-based vehicles and stationary waysides 18.

Figure 14:
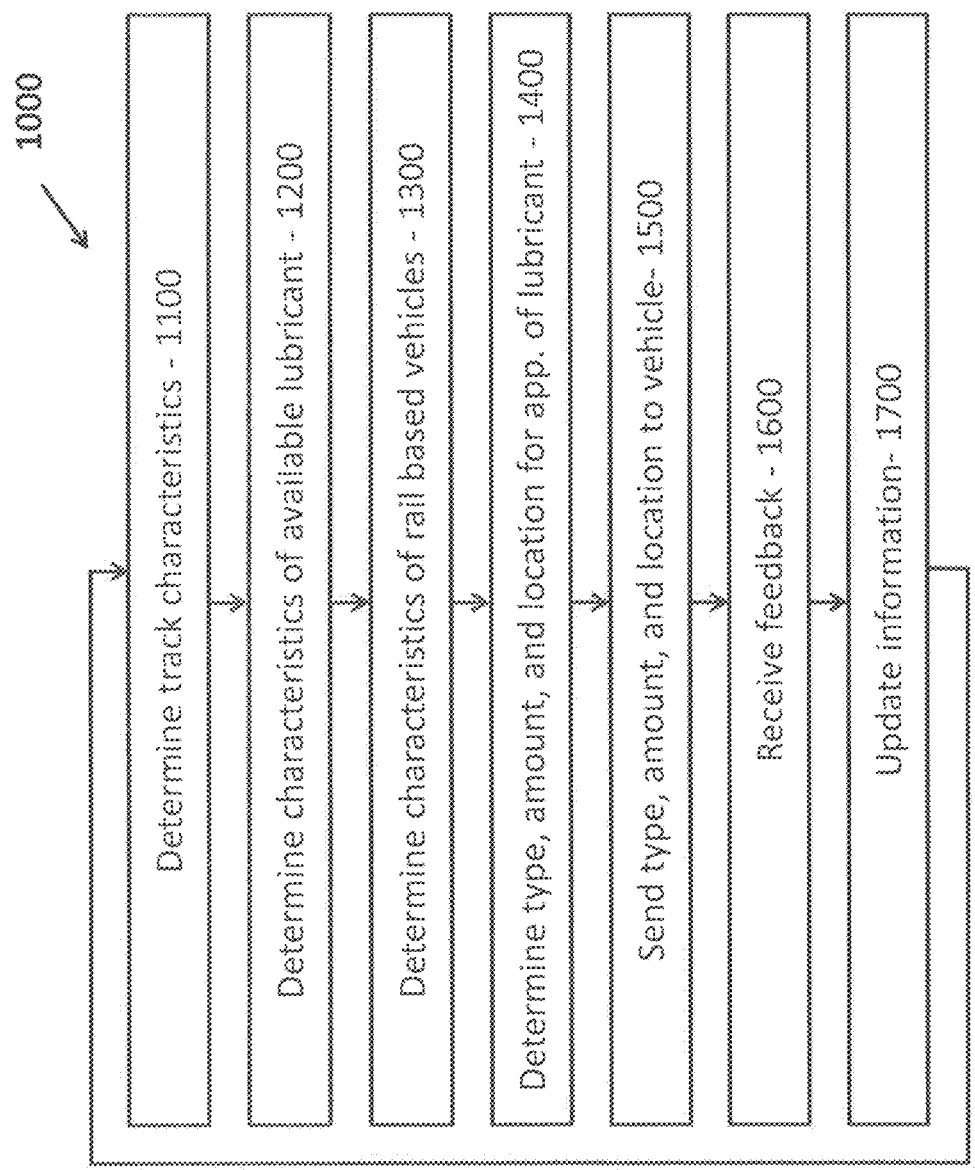
FIG. 14 is a flow diagram of a method performed by components of the system according to an aspect.

In an aspect, as shown by the method (1000) illustrated in FIG. 14, the lubrication application 408 can determine the characteristics of the track 14 on which the rail-based vehicles 16 are traveling (step 1100), determine characteristic of available lubricant (step 1200), determine the characteristics of the rail-based vehicles 16 (step 1300), determine the appropriate type, amount, and location(s) for application of the lubricant for each rail-based vehicle 16 (step 1400), send the appropriate type, amount, and location information of application for each rail-based vehicle (step 1500), receive feedback information (step 1600), and update information for the rail-based vehicle 16 and track 14 based on feedback information (step 1700).

The lubrication application 408 can determine the characteristics of the track(s) 14 of which the fleet system 10 utilizes (step 1100). In an aspect, the lubrication application can refer to the track database 600 to obtain the characteristics of the track 14. In an aspect, the lubrication application can call on the track profiles 602 to obtain such information. The lubrication application 408 can obtain the characteristics of the portions 605 of the track, including, but not limited to, whether there is a curve 610, the degree 612 of the curve, the length 613 of the curve, the speed range 614, the type of track 605, location 616, the elevation 618, and any known events 619 (e.g., tunnel, squeaky section, etc.) of sections of the track, the length of such curvatures, the track type, and the like.

Once the characteristics of the track 14 have been obtained, the lubrication application 408 can then determine the characteristics of the lubricants available to the system 10 (step 1200). In an aspect, the lubrication application 408 can call upon the lubricant database 700 to provide information regarding the lubricants available to the system 10. In an aspect, the lubrication application 408 can obtain such information from the lubricant profiles 702 found in the lubricant database 700. The lubrication application 408 can then obtain the characteristics of the available lubricants 704, including the physical properties 706, commercial properties 708, and specific performance properties 710.

The lubrication application 408 can then determine what lubricants are available on the rail-based vehicle 14 and the characteristics of the vehicle (step 1300). In an aspect, the lubrication application 408 can turn to the vehicle database 500 to find what types and the amount of lubricant are available on the rail-based vehicle 16, the types and number of lubrication systems 20 and lubrication controllers 30 associated with each rail-based vehicle 16, and the important physical characteristics of the rail-based vehicle 16. As discussed above, these physical characteristics can include, but are not limited to, wheel type, weight and speed restrains, and the like.

In an aspect, the lubrication application 408 can call on the vehicle database 500 to produce the corresponding vehicle profile 502 to gain this information. For example, the lubrication application 408 can obtain the type(s) of lubrication system(s) 30 on the vehicle (520), the type of lubrication(s) (522) used by the lubrication system 30, the amount of the lubrication (524) currently available for use by the lubrication system 30, the wheel type 510, and other information 512 (e.g., speed and weight limits).

After the lubrication application 408 has identified the characteristics of the track (step 1100), the characteristics of the lubricants available to the system 10 (1200), and the characteristics of the rail-based vehicles 16 of the fleet (step 1300), including the lubricants available to each rail-based vehicle 16, the lubrication application 408 can then determine the appropriate type, amount, and location(s) for application of lubricant for each rail-based vehicle 16 (step 1400). In an aspect, the lubrication application 408 can utilize the specific performance properties 710 to find the correct parameters (location, amount, type of lubrication) for lubrication application to the tracks 14 for each rail-based vehicle 16. As discussed above, the specific performance properties 710 can include the temperature ranges in which the lubricant can be used, the length and degree at which a lubricant is effective in a curve, whether the lubricant is effective at a given speed, and the like. The lubrication application 408 can then match the most effective lubricants, the amount, and locations for application of the lubricants based upon the characteristics of the track (a curve 610, the degree 612 of the curve, the length 613 of the curve, the speed range 614, the type of track 605, location 616, the elevation 618, and any known events 619, etc.) and vehicle (vehicle type 506, use 514, wheel type 510, vehicle information 512, custom information 513, lubricant system 520, type 522, and amount available 524) that correspond to the specification performance properties 710.

Figure 15:
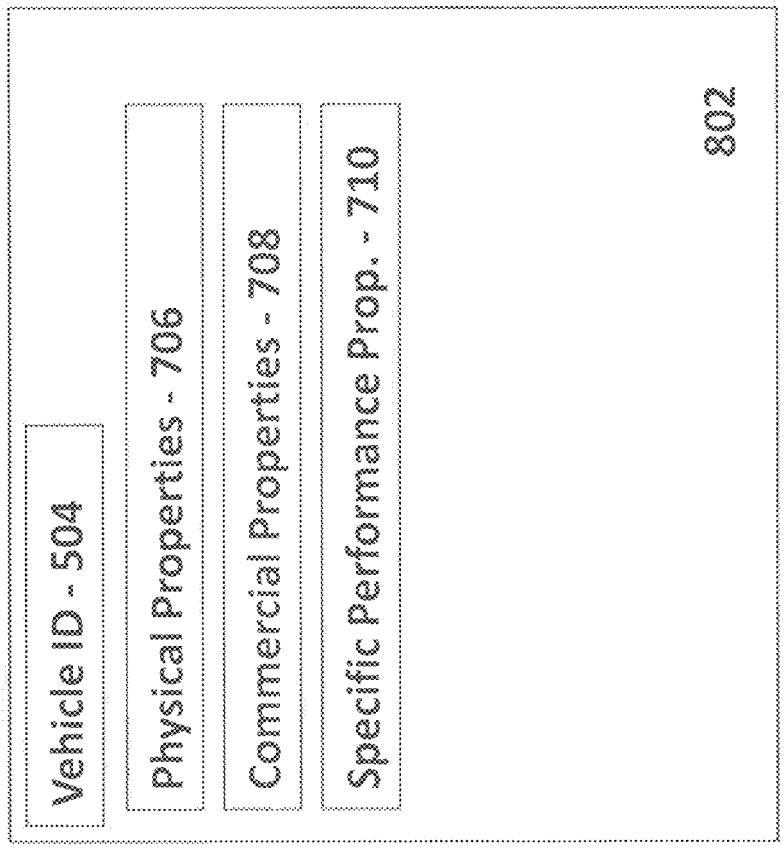
FIG. 15 is a block diagram of a lubrication plan profile according to an aspect.

After determining the appropriate amount of lubricant for each lubrication system 20 with each rail-based vehicle 16 to apply at each location, the lubrication application 408 can create the lubrication plan. In an aspect, the lubrication application 408 creates a lubrication plan profile 802 for each rail-based vehicle 16 to implement the lubrication plan, as shown in FIGS. 10 and 15. The lubrication plan profile 802 is made for each vehicle 16 and includes the appropriate vehicle identifier 504. The lubrication plan profile 802 can include specific instructions for the amount of lubricant to be applied at each location 804 determined by the lubrication application 408. Each plan profile 802 can include a plurality of locations 804. For each location 804, instructions are generated for the correct lubrication system 520, the type of lubricant 522, and the amount to apply 806. In an aspect, the amount to apply 806 is given by a volume. After creation, the lubrication plan profiles 802 can be saved on the lubrication plan database 800.

In an aspect, the lubrication plans for each stationary wayside 18 can be determined in same manner as discussed for the rail-based vehicles 16 above. In an aspect, the lubrication plans for the stationary waysides 18 from accessing the information contained in the track profiles 602 (location 624, the lubrication available 625, and the level 626) and the lubrication profiles 702.

Once the application parameters have been determined (step 1400), the lubrication application 408 can then send the appropriate type, amount, and location information for application of the lubricant to the rail-based vehicles 16 (step 1500). In an aspect, the parameters can be sent in the form of the lubrication plan profile 802. In an aspect, the parameters are sent to the lubrication controller 30 for the appropriate rail-based vehicle 16. The commands can be sent over the various networks 50 described above.

Once the parameters have been delivered to the appropriate lubrication controller(s) 30 (step 1500), the lubrication application 408 is prepared to receive feedback information (step 1600). The feedback information can include information from the lubrication controller 30 and sensors found on the rail-based vehicles 16 and wayside stations 18. For example, such information can include, but is not limited to, the current amount of lubricant available for each lubrication system 20, the ambient temperature at the lubrication systems 20 (on the rail-based vehicle 16 or the wayside station 18), the noise recorded from microphones at a particular location, a friction co-efficient, and increase in energy use, a difference in the RPMs of adjacent axels of a rail-base vehicle, the status of the lubrication applicator/spray (e.g., whether it is functioning, available, etc.) and the like.

In an aspect, upon receiving this information, the lubrication application 408 can then update information stored in the various databases 500, 600 700 of the central fleet management server 40. This information can then be updated (1700) in the various databases. In an aspect, the information can be updated in the appropriate profiles. Such updated information can then be used to optimize the lubrication plans, discussed in more detail below.

Figure 16:
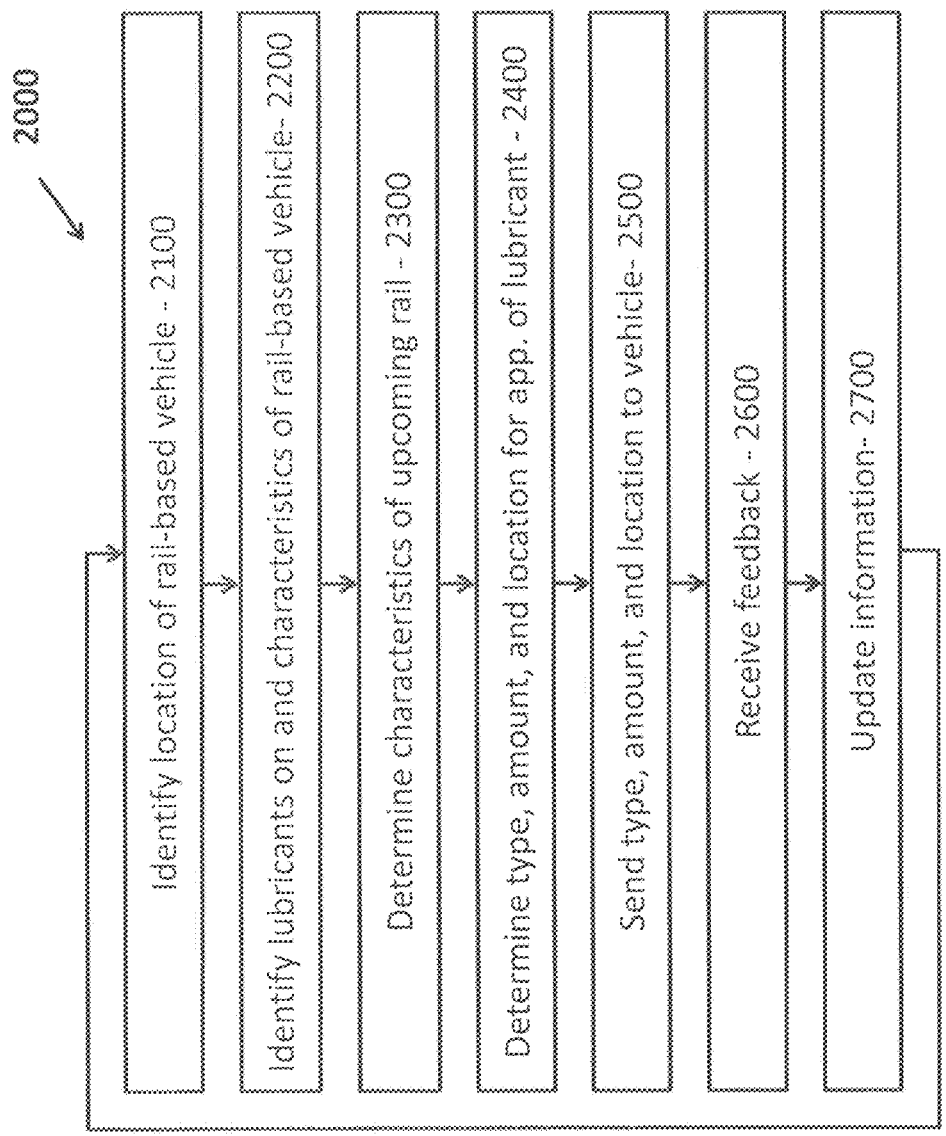
FIG. 16 is a flow diagram of a method performed by components of the system according to an aspect.

In another aspect, the lubrication application 408 can create lubrication plans to be sent to rail-based vehicles 16 and stationary waysides 18 of a fleet according to a method 2000 illustrated in FIG. 16. In an aspect, the lubrication application 408 can identify the location of the rail-based vehicle 16 (step 2100), identify the lubricant(s) found on the rail-based vehicle 16 and the rail-based vehicle's characteristics (step 2200), determine the upcoming characteristics of the track 14 on which the rail-based vehicle 16 is traveling (step 2300), determine the appropriate type, amount, and location for application of the lubricant (step 2400), send the appropriate type, amount, and location information of application to the rail-based vehicle (step 2500), receive feedback information (step 2600), and update information for the rail-based vehicle 16 and track 14 based on feedback information (step 2700) before returning to step 1100.

In an aspect, the lubrication application 408 can call on the vehicle database 500 in order to determine the location of a given rail-based vehicle 16 (step 2100). For example, for any given rail-based vehicle 16, the lubrication application 408 can request the vehicle profile 502 that corresponds to a selected vehicle identifier 504. The identifier 504 can be selected based upon the monitoring of a given track 14 and the knowledge that a given line/train is on that particular track 14. For example, the lubrication application 408 can refer to the line identifier 515 to determine the particular line 515*a* on which the vehicle is assigned. The lubrication application 408 can then look to see the location identifier 516 to determine the location of the rail-based vehicle 16. In an aspect, the location identifier 516 can be in the form of GPS coordinates and the like. In another aspect, the lubrication application 408 can receive directly from a specific rail-based vehicle 16 its current location on a given track 14 directly, which can trigger the process (2000) as well.

The lubrication application 408 can then determine what lubricants are available on the rail-based vehicle and the characteristics of the vehicle (step 2200). In an aspect, the lubrication application 408 can turn to the vehicle database 500 to find what types and the amount of lubricant are available on the rail-based vehicle 16, the types and number of lubrication systems 20 and lubrication controllers 30 associated with each rail-based vehicle 16, and the important physical characteristics of the rail-based vehicle 16. As discussed above, these physical characteristics can include, but are not limited to, wheel type, weight and speed restrains, and the like.

In an aspect, the lubrication application 408 can call on the vehicle database 500 to produce the corresponding vehicle profile 502 to gain this information. For example, the lubrication application 408 can obtain the type(s) of lubrication system(s) 30 on the vehicle (520), the type of lubrication(s) (522) used by the lubrication system 30, the amount of the lubrication (524) currently available for use by the lubrication system 30, the wheel type 510, and other information 512 (e.g., speed and weight limits).

Once the location and characteristics of the rail-based vehicle 16 have been determined (steps 2100 and 2200), the lubrication application 408 can determine the upcoming characteristics of the track 14 (step 2300). In an aspect, the lubrication application 408 can turn to the track database 600 to find corresponding information. The lubrication application 408 can obtain the characteristics of the approaching sections of the track 14, including, but not limited to, the curvature of the approaching track 14, the length of such curvatures, whether or not the section ahead is being occupied by other vehicles, the track type, and the like.

In an aspect, the lubrication application 408 can use the line identifier 515*a* associated with the rail-based vehicle profile 502 of the particular vehicle 16 to find the corresponding track profile 602. Once the track profile 602 has been determined, the lubrication application 408 can use the location identifier 516 of the rail-based vehicle 16 to determine the upcoming sections of the track 14. For example, the lubrication application 408 can obtain the degree of the curve 612 and length 613 of the section, the speed range 614, as well as the location(s) was to where the section begins and ends. In addition, the lubrication application 408 can also obtain the elevation 618 as well, and event elements 619 for which the lubrication application 408 needs to be aware. The lubrication application 408 can also determine whether or not any stationary wayside sites 622 are present, which can identify a specific stationary wayside site 623, its location 624, the type(s) of lubrication controller(s) 30 being used at that location 625, and the type and amount of lubricant available to the lubrication controller.

After the lubrication application 408 has identified the characteristics of the upcoming portions of the track (step 2300), the lubrication application can then determine the appropriate type, amount, and location for application of the lubricant (step 2400). In an aspect, the lubrication application 408 can call on the lubricant database 700 to provide the specific performance information of the available lubricants to the rail-based vehicle to determine the appropriate type, amount, and location for the application of the best lubricant. In an aspect, the lubrication application 408 can compare the specific performance information of the available lubricants to the characteristics of the vehicle and approaching portions of track to find the type and conditions (amount (e.g., 2 dosages for 3 seconds), placement) for which to apply the lubricant.

In an aspect, the lubrication application 408 can call on the lubricant database 700 to deliver the lubricant profiles 702 that correspond to the lubricants available to the rail-based vehicle 16. For example, the lubricant profiles 702 having lubricant identifiers 704 that correspond to the lubricant types 522 found on the rail-based vehicle 16 or the lubricants 626 available at stationary waysides 622. From here, the lubrication application 408 can then find the specific performance information elements 706 that correspond to the other information already obtained about the rail-based vehicle and the characteristics of the track 14 ahead.

Once the application parameters have been determined (step 2400), the lubrication application 408 can then send the appropriate type, amount, and location information of application of the lubricant to the rail-based vehicle (step 2500). In an aspect, the parameters are sent to the appropriate lubrication controller 30. For example, the lubrication controller 30 can be found on the rail-based vehicle 16 or at a wayside station 18. The commands can be sent over the various networks 50 described above.

In an aspect, if the lubrication application 408 determines that certain event elements 619 are approaching, such as, a tunnel where no communication is available, the lubrication application 408 can include multiple application parameters in the command that the lubrication controller 30 can receive and follow. For example, the command can instruct the lubrication controller 30 to apply a first and second application every 100 m on the track within the tunnel. Other similar parameters can be given as well.

Once the parameters have been delivered to the appropriate lubrication controller(s) 30 (step 2500), the lubrication application 408 is prepared to receive feedback information (step 2600). The feedback information can include information from the sensors found on the rail-based vehicles 16 and wayside stations 18. For example, such information can include, but is not limited to, the current amount of lubricant available for each lubrication system 20, the ambient temperature at the lubrication systems 20 (on the rail-based vehicle or the wayside station), the noise recorded form microphones at a particular location, a friction co-efficient, and increase in energy use, a difference in the RPMs of adjacent axels of a rail-base vehicle, the status of the lubrication applicator/spray (e.g., whether it is functioning, available, etc.) and the like. This information can then be updated (2700) in the various databases. In an aspect, the information can be updated in the appropriate profiles.

In an aspect, the lubrication controller 30 can control the lubrication systems 20 and the application of lubricants based upon the commands received from the central fleet management server 40. In an aspect, the lubrication controller 30 utilizes the lubrication management application 306 to control the lubrication systems 20. The lubrication management application 306 can take the application parameters from the command(s) received, identify the correct lubrication system 20 and lubricant to use, and apply the amount of lubricant for a specified time at a given location. In an aspect where the commands are directed to a controller 30 on a rail-based vehicle 16, the initiation of the application can be based upon the rail-based vehicle 16 arriving at the location. In such an aspect, when the coordinates obtained by the GPS module 328 correspond to the location coordinates of the command, the lubrication management application 306 can then initiate the application of the specified lubricant by the lubrication system 20.

FIG. 17 illustrates a method (3000) performed by the lubrication management application 306 according to an aspect. The lubrication management application 306 can receive commands (3100), apply lubrication based upon the commands (3200), and send feedback information (3300).

In an aspect, the lubrication management application 306 can receive commands (3100) from the central fleet management server 40 via the communication networks 50. The commands can be received by the transceiver 302, which can then direct the commands to the lubrication management application 306 at the direction of the controller 300. In an aspect, the commands can take the form of the lubrication plan profiles 802 discussed above, including the specific locations, the specific lubricant to use, and the amount as determined by the lubrication application 408.

Once the commands are received, the lubrication management application 306 can apply the lubrication based upon the commands (3200). In an aspect, as illustrated in FIG. 18, the lubrication management application 306 can apply the lubrication by determining the location of the rail-based vehicle (step 3210) and then execute the commands (step 3220).

Figure 18:
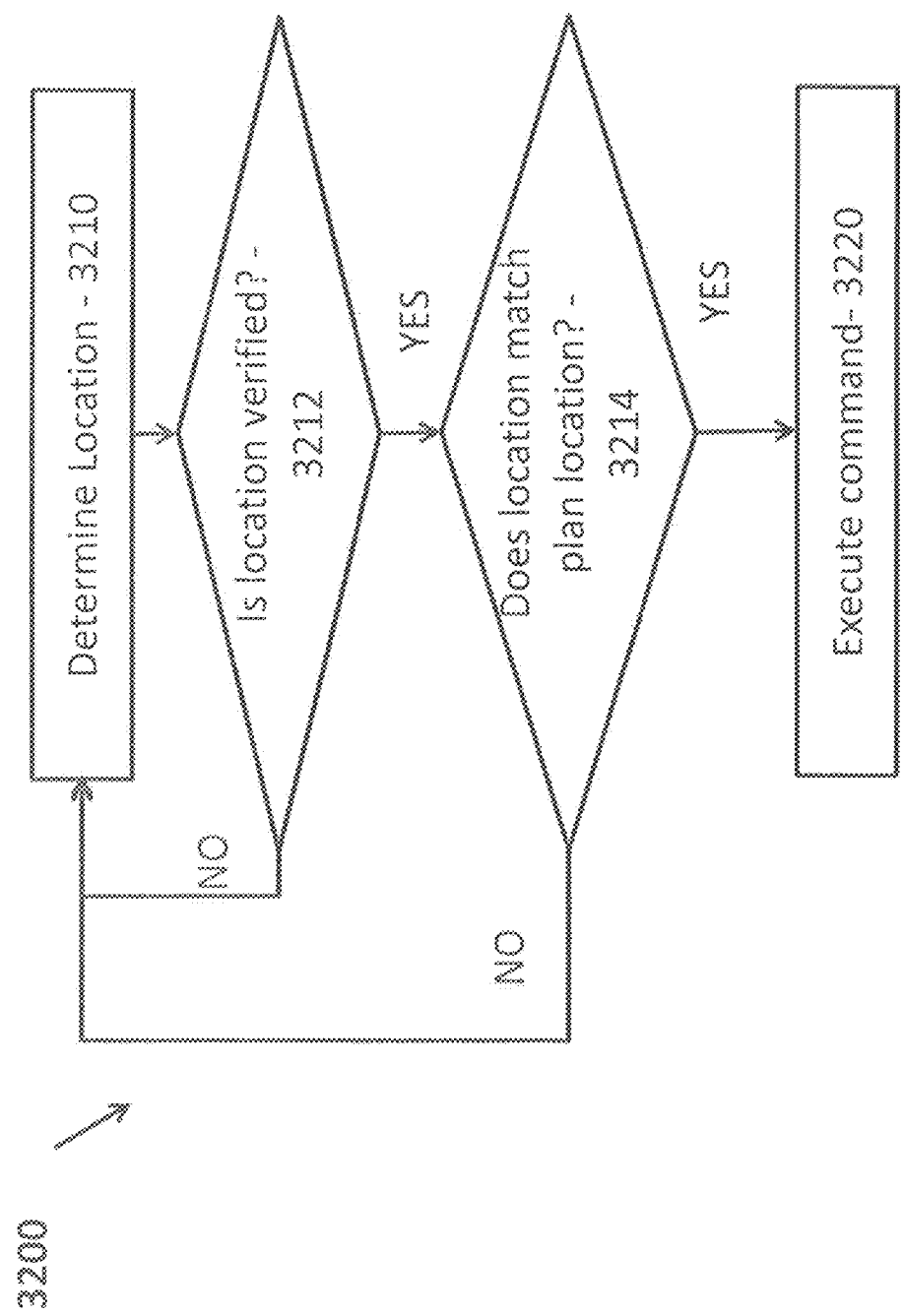
FIG. 18 is a flow diagram of a method performed by components of the system according to an aspect.

As shown in FIG. 18, the lubrication management application 306 can determine the location of the rail-based vehicle 16 (step 3210). In an aspect, the location can be determined by calling on the GPS module 328 to provide the coordinates of the rail-based vehicle 16. However, in other aspects, other location determination means, including those discussed above, can be called upon to determine the location. The provided location can then be verified (step 3212). The lubrication management application 306 can call upon various components of the controller 30 or the rail-based vehicle 16 to verify the location. In an aspect, the lubrication management application 306 can call upon the location verification application 307 to verify the location of the rail-based vehicle 16. In an aspect, the verification application 307 can verify the current location of the rail-based vehicle 16 by using the previously verified location of the rail-based vehicle 16, the speed of the rail-based vehicle 16, and the time since the last verification to verify the location. If it cannot verify the location, it will record it and return to check the location (3210).

If the location verification application 307 verifies the location, then lubrication management application 306 will then see if the current location matches a location that matches one found in the commands (step 3214). If a match is found, the commands will be executed (step 3220). If not, the commands will not be executed, and will wait until a matching location is found (step 3210).

Once the lubricant has been applied (step 3200), the lubrication management application 306 can then direct the lubrication controller 30 to monitor and record information (step 3300). The information that is recorded and monitored can include alerts and other statistics associated with the application of lubrication. In an aspect, the lubrication controller 30 can collect information from the signals produced by the various sensors associated with the lubrication system and lubrication controller 30. In an aspect, the information can be recorded in a log. file. In an aspect, the controller 30 can be configured to report back such information at regular intervals, or when a certain event, such as with determined error classes or $3^{rd}$ party plug-in commands that reports require.

In an aspect, the lubrication controllers 30 can receive updated lubrication plans from the central fleet management server 40. In an aspect, the lubrication controller 30 can verify whether the new plan is appropriate for it, as shown by the method 4000 illustrated in FIG. 19. As shown, the lubrication controller 30 receives a new lubrication plan (step 4100). In an aspect, the plan can take the form of a lubrication plan profile 802. In an aspect, the lubrication controller 30 can call on the lubrication management application 306 to determine whether if the plan is acceptable for the given rail-based vehicle (step 4200). For example, the lubrication management application 306 can look to see if the updated plan is applicable to that rail-based vehicle (e.g., can the lubrication system 20 apply the lubricant as requested). If the plan can be implemented, the lubrication management application 306 can then implement the changes to the commands/profiles and confirm the changes (step 4300). In an aspect, the lubrication management application 306 can store the new commands/profiles 306 one of the databases 316 of the controller 30. If the new commands/profiles cannot be verified as being performable, the lubrication management application 306 will continue to apply the previous plan, and record the denial of implementing the new plan (step 4400).

In an aspect, as shown in FIG. 9, in addition the lubrication application 408, the central fleet management server 40 can utilize an import/export application 407, monitoring and report application 409, and an optimizing application 411 for the efficient operation of the rail-wheel system 12.

Figure 20:
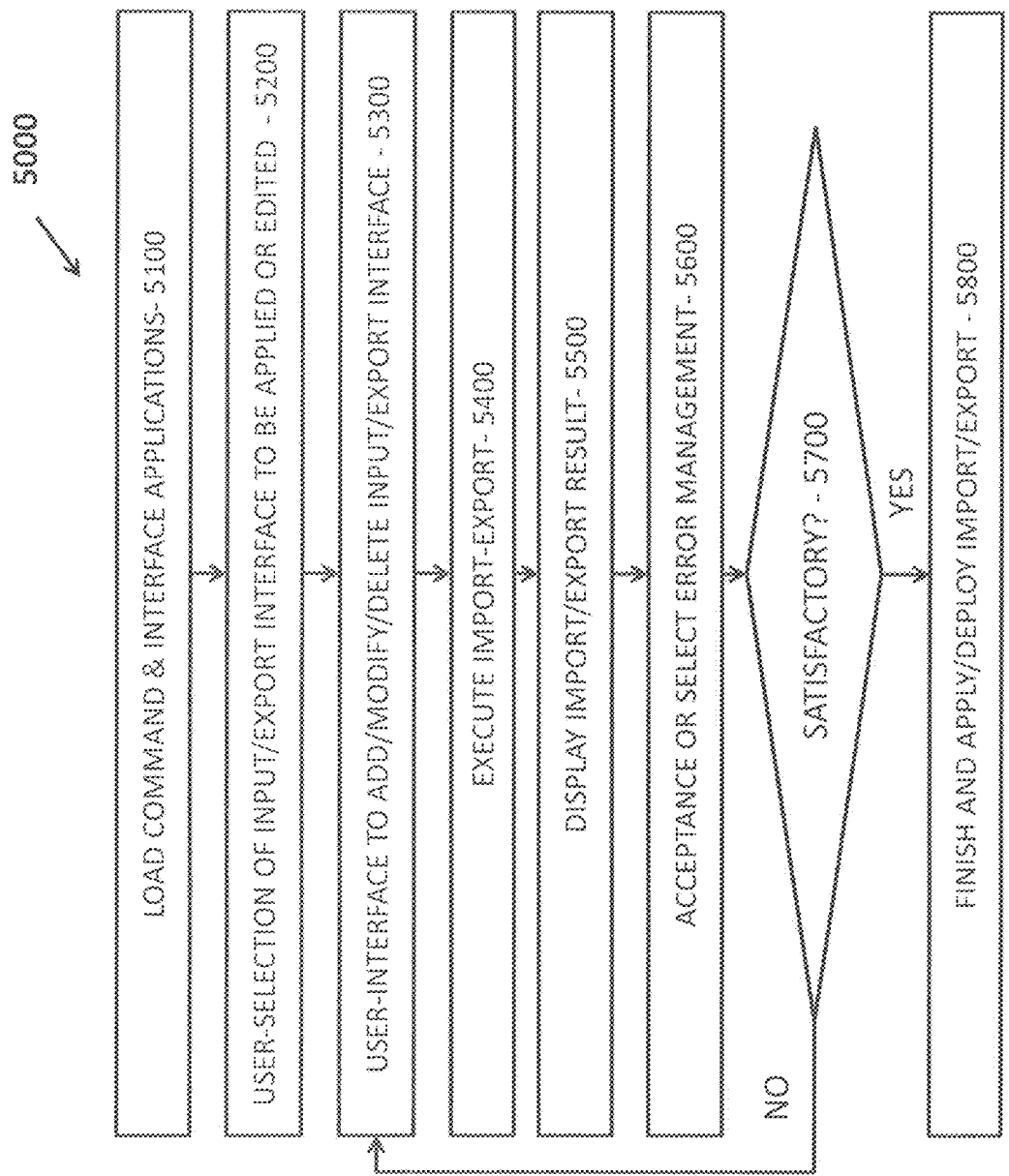
FIG. 20 is a flow diagram of a method performed by components of the system according to an aspect.

The import/export application 407 allows a user to manage the input and export different applications and interfaces to be utilized by the wheel-rail lubrication and noise fleet management system 10, according to the method (5000) shown in FIG. 20. The installed interfaces can allow the control and monitoring of the system from remote devices 60 as shown in FIG. 4. The applications and information can include GIS-data and systems (e.g., NMEA 1.8, NMEA 2000, XMAP, Google Earth, Master Navigator Software (MNS)—Map and Navigation Software, seaPro Navigation Software, OrbitGPS, ElectricCompass, Telogis GeoBase, NetStumbler, Nimble Navigator, Rand McNally StreetFinder, Coastal Explorer by Rosepoint Navigation, Magic e-Map, GPS 2 IP, NemaTalker NMEA instrument simulation, Microsoft Streets & Trips, Microsoft MapPoint, Serotonin Mango M2M, MapKing, gpsd—Unix GPS Daemon, GPSy X for Mac OS X, Turbo GPS PC/PPC/Android, GRLevelX Weather Suite, Google Maps Mobile Edition, JOSM—OpenStreetMap Map Editor, PolarCOM, Avia Sail, VisualGPS, DeLorme Street Atlas, GPS TrackMaker, Java Marine API, Vox Maris GMDSS Simulator, C_GPS2KML), predetermined lubrication plans, actual geographic information (including the information contained in the various databases above), and custom interfaces. For example, the interfaces can include standard interfaces for SQL, ASCII, ODBC, and the like, or custom interfaces for various other systems. These interfaces allow the wheel-rail lubrication and noise fleet management system 10 to have the ability to have access to or communicate with other systems.

The import/export application 407 can first load command and interface applications 5100. The applications can be found on the central fleet management server 40, or can be uploaded to the central fleet management server 40 through other means. The import/export application 407 can then allow the user/system administrator to select the interfaces to be applied or edited (step 5200). Such interfaces can import/export existing vehicle, track, lubricant, lubrication plans data or databases. The import/export function can provide specific input conversion of the today's many different available GIS application software programs, with many cities already having their GPS data available. If desired, the import/export application 407 allows the user to modify, edit, or add to the interfaces desired (step 5300). Once the interfaces have been selected and modified, the import/export application 407 can install/activate the interfaces (step 5400). The import/export application 407 can then report the results of the installation/activation (step 5500). Upon reporting the results, the import/export application 407 can then provide the option of accepting the results or allowing the user to manage any resulting errors (step 5600). After accepting or repairing the errors, the user can determine if the import/export is satisfactory (step 5700). If the import/export is satisfactory, the import/export application 407 can then finalize the import and export of data files, interfaces, and the like (step 5800). If not, the application will return to step 5300.

Figure 21:
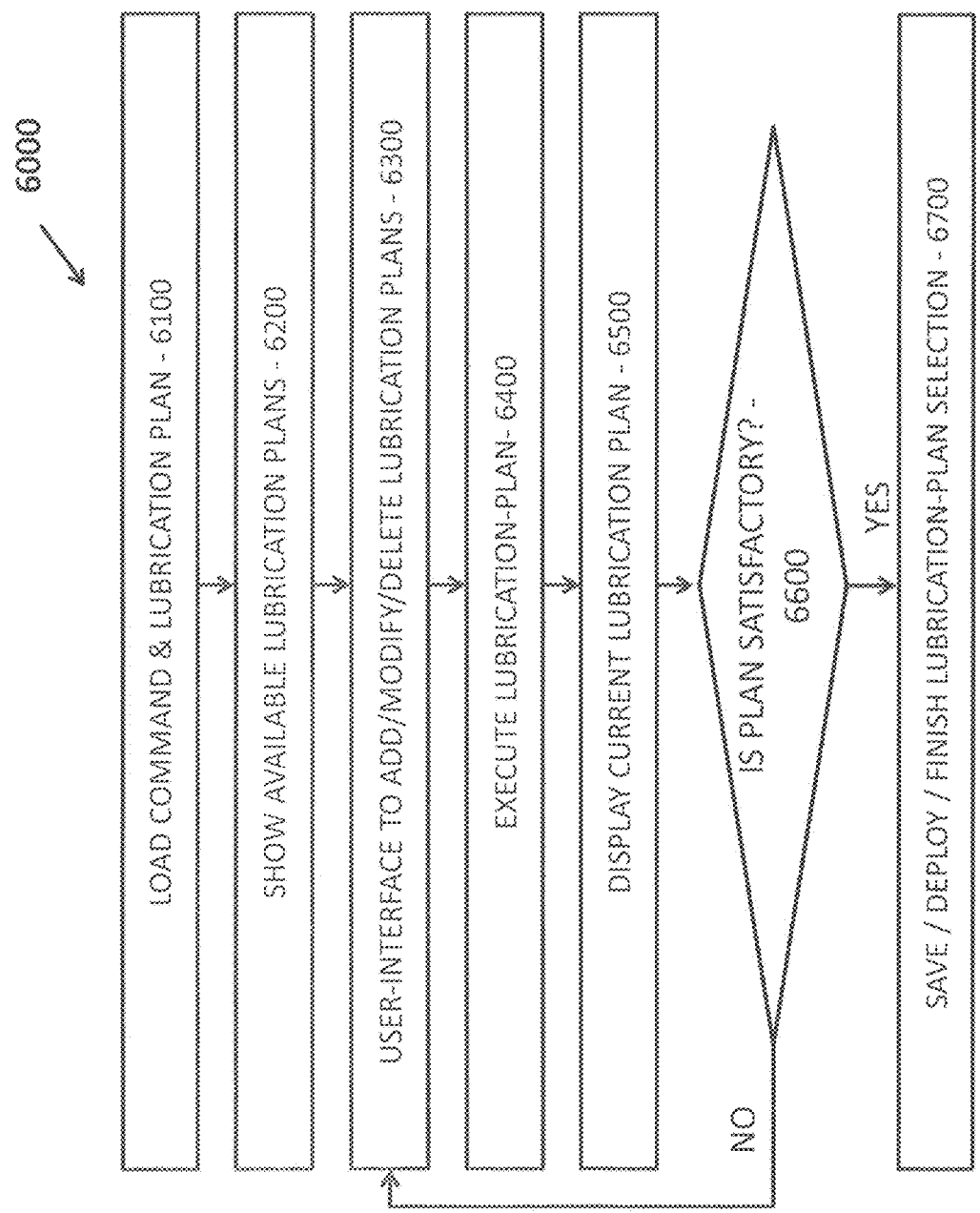
FIG. 21 is a flow diagram of a method performed by components of the system according to an aspect.

In an aspect, the lubrication application 408 can also provide predetermined lubrication plans according to the method (6000) as illustrated in FIG. 21. In an aspect, the lubrication application 408 can load commands and lubrication plans to the central fleet management server 40 (Step 6100). In an aspect, the commands can be found pre-loaded in the lubrication plan database 800, or can be imported from another source. The lubrication plans can include a variety of types of plans. For example, the plans can be focused on noise-reduction, wheel conditioning, or the economical application of lubrication. Once provided, the lubrication application 408 can display the available lubrication plans (step 6200). The lubrication application 408 can call on the display device of the central fleet management server 40 to display to available lubrication plans to the user. The user can then utilize the user-interface to add to, modify, or delete portions or all of the lubrication plans (6300). Once the desired lubrication plan has been found (through modification, addition, or the like), the user can select and execute the lubrication plan (step 6400). If the plan is satisfactory to the user (step 6600), the plan is selected and saved/deployed/finished (step 6700). If the user decides to deploy a new or edited lubrication plan, the lubrication plan will send to the appropriate lubrication controller 30 on the wheel-rail based vehicles 16 or appropriate wayside lubricator systems 18. Otherwise, the user can return to step 6300.

Figure 22:
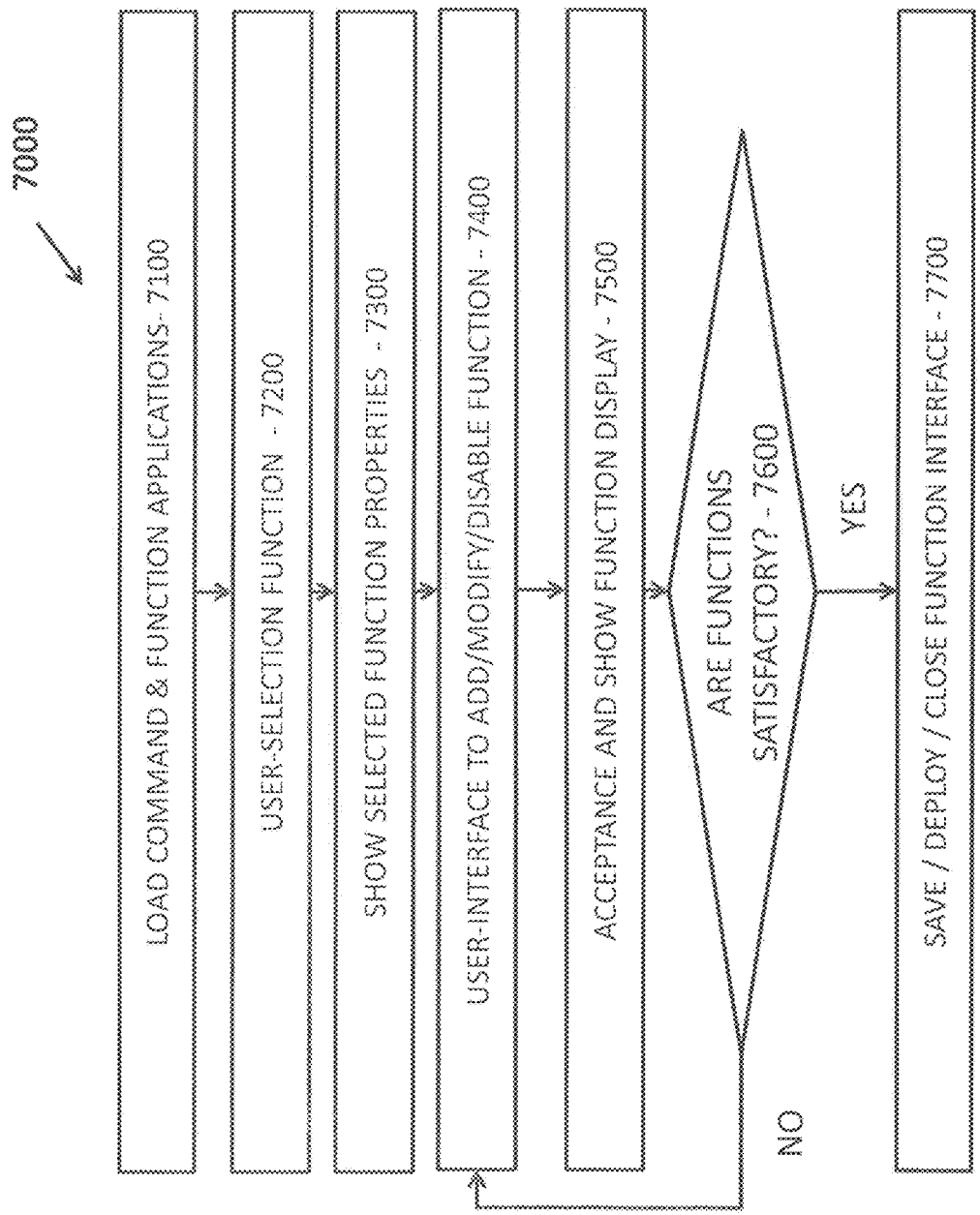
FIG. 22 is a flow diagram of a method performed by components of the system according to an aspect.

In an aspect, as illustrated in method 7000 of FIG. 22, the wheel-rail lubrication and noise fleet management system 10 can allow a user to select and implement functions associated with lubrication and noise management of rail systems 12. The functions can include, but are not limited to, noise control functions, conditioning functions, GPS exchange functions, adhesion-range functions, and plug-in functions. In an aspect, the functions can also supply predetermined lubrication plans. In an example of such an aspect, the lubrication plans can include once a day lubricating (useful for lines with very few vehicles pass), seasonal lubricating (based upon seasonal/climate changes—one for winter and one for summer), economic/environmentally friendly lubricating (using the least amount of lubricant as possible), and the like.

In an aspect, a plug-in function is a 3rd party application, which utilizes the fleet wheel/rail lubrication and noise control infrastructure. To run a 3rd party plug-in, a specific driver can be provided. The lubrication application 408 can manage the implementation/selection of the functions according to an aspect. The lubrication application 408 can load the command and function (step 7100). The lubrication application 408 can then display the available functions/commands to a user (step 7200). The user interface can also display the properties of the functions based upon the selection of the user (step 7300). In an aspect, the lubrication application 408 can call on a user-interface to provide the user with the options to add, modify, or disable certain functions, including the properties (step 7400). After the properties have been modified or disabled, the lubrication application 408 then allows the user to determine if the function as modified is acceptable, including showing the modifications (step 7500). If the functions are satisfactory (step 7600), the functions are saved and deployed (step 7600). If the functions are not satisfactory, the lubrication application can return to the modification option (step 7400).

Figure 23:
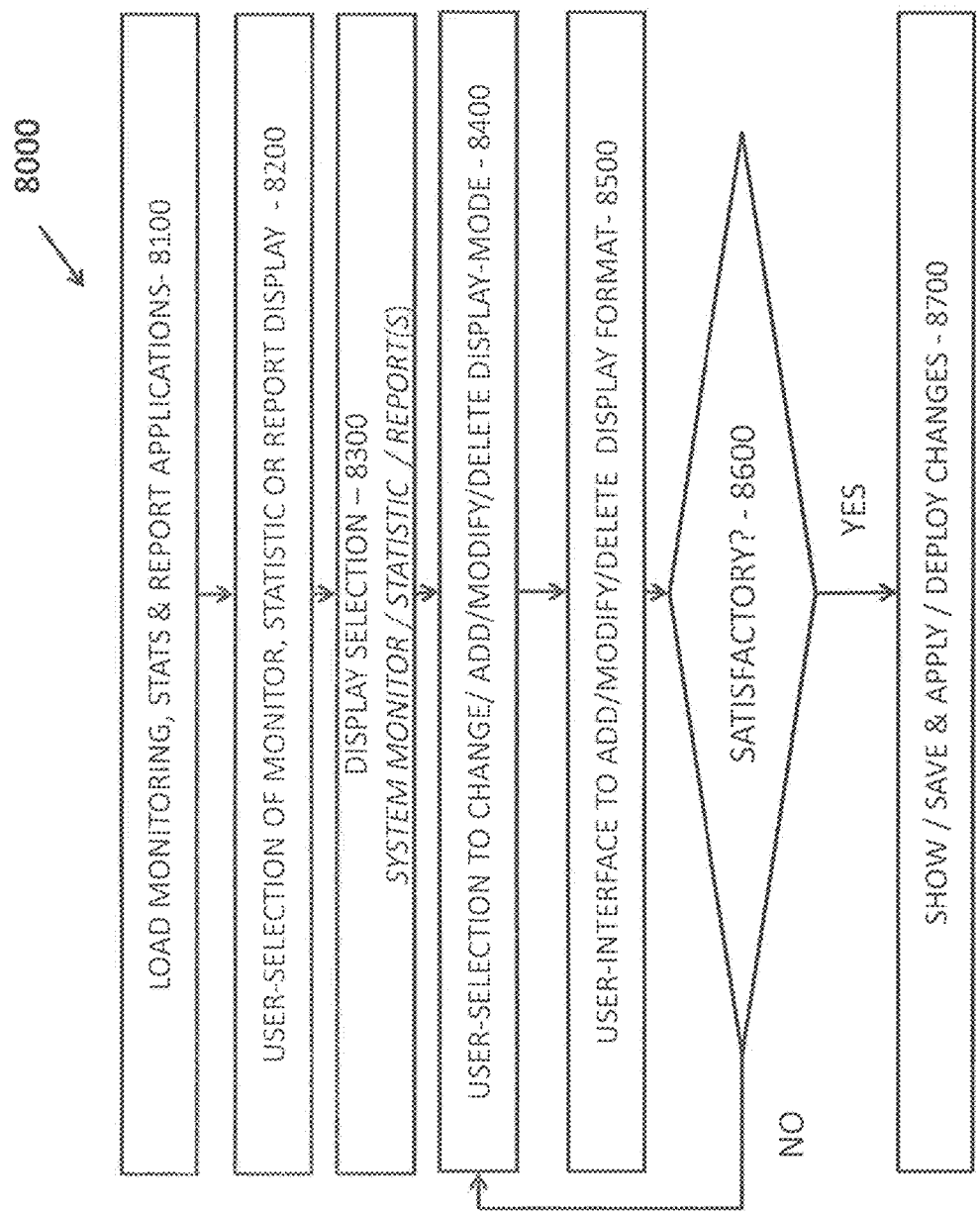
FIG. 23 is a flow diagram of a method performed by components of the system according to an aspect.

In an aspect, a user can customize the real time reporting functions of the system according to an aspect illustrated by method 8000 shown in FIG. 23. The system can call on the monitoring/reporting application 409 (the M/R application). The M/R application 409 can call on the system to provide various monitoring, statistical, and reporting applications (step 8100). These M/R functions 409 can be displayed on any fleet wheel/rail lubrication and noise management access display or can be exported for the applications can be supplied by the user, to be analyzed or through other available means. The M/R application 409 can then display the available monitoring/statistic/reporting applications to the user and allow for their selection through an interface (step 8200). Once selected, the M/R application 409 can display the selected application (step 8300). The user can then modify how the selected application displays the information (step 8400). The user can change, add, modify, or delete certain display modes of the selected application. After the modification, the user can then modify/add/delete the display format (step 8500). If the modifications made (step 8400, 8500) are satisfactory (step 8600), the changes are saved, applied, and deployed (8700). If not, the modification steps (8400, 8500) are repeated.

Figure 24:
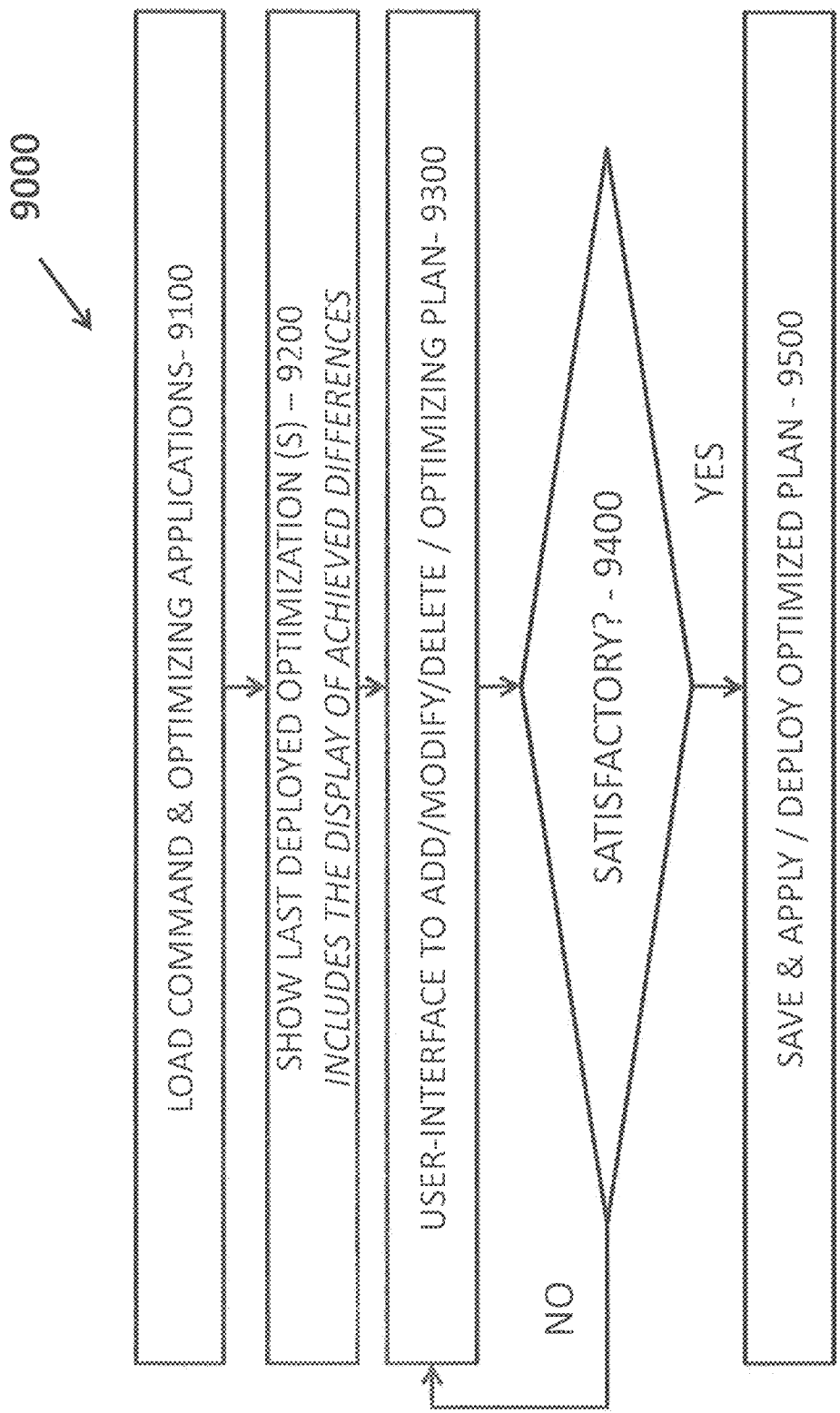
FIG. 24 is a flow diagram of a method performed by components of the system according to an aspect.

In an aspect, the wheel-rail lubrication and noise fleet management system 10 can provide an optimization application 411 to provide a method of optimizing the lubrication plans of the system 10 as illustrated by the method (9000) of FIG. 24. The wheel-rail lubrication and noise fleet management system 10 can load the command and optimization applications 411 (step 9100) that are available to the system 10. The applications 411 can be found on the memory or storage devices of the central fleet management server 40, or can be supplied through an external source or through a web-enabled interface. The optimization application 411 can then display the lasted deployed optimizations to the user (step 9200). The displayed optimizations can display the achieved differences between previous settings and the current plans. Once displayed, the optimization application can then allow a user to modify, add to, or delete certain aspects of the current lubrication plan (step 9300). If the user finds the changes satisfactory (step 9400), the changes are saved, applied, and deployed (step 9500). Otherwise, the optimization application 411 returns to the user-interface to allow additional changes (step 9300).

Figure 25:
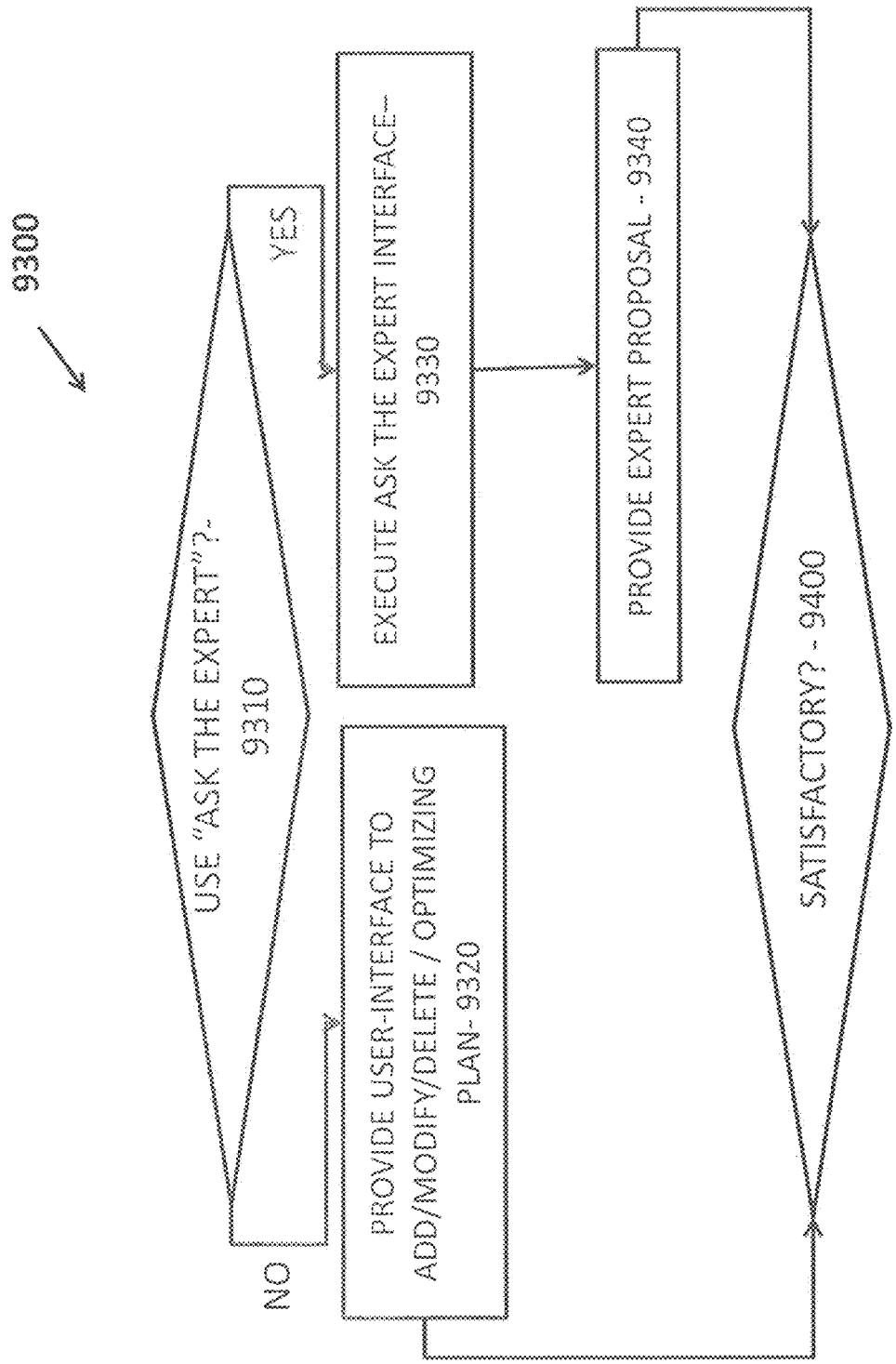
FIG. 25 is a flow diagram of a method performed by components of the system according to an aspect.

In an aspect, as illustrated in FIG. 25, the modification of the plans (step 9300) can provide the user with more than one option. In an aspect, the optimization application 411 can include an option to call upon an outside service to optimize the plan. Such an option can be referred to "Ask the Expert". In an example, the user can be prompted with the option as to whether or not to use the "Ask the Expert" function (step 9310). If the user declines the use, the optimization application 411 will provide the user with an interface that allows the user to modify, add to, or delete from the optimization plan already in place (step 9320), which the user can determine is satisfactory or not as discussed above (step 9400).

If the user wishes to use the function, the optimization application 411 will call upon the an "Ask the Expert" interface (step 9330) which can establish a connection with a remote server through the various network connections 50a, 50b, 50c, and 50d, available to the system to call on the remote service, as shown in FIG. 25. In an aspect, the "Ask the Expert" interface can provide two options for support for the user: (1) a live support person can communicate/connect with the user, or (2) the user can select offline support. If the user selects a live support person, a connection can be established between the live support person and user through online conferencing applications, including, but not limited to NetMeeting, GotoMeeting and the like. In another aspect, the live support person can initiate other communication and data transferring means to carry out the support in a live fashion.

If the user selects the offline support option, the a wheel-rail lubrication and noise fleet management system 10 can send the previous optimization plan to the remote server, as well as any other needed data. In an aspect, the remote service can also request additional information and feedback form the optimization application 411 through the "Ask the Expert" interface. The "Ask the Expert" interface can then receive, with a time delay (next day) the expert proposal from the remote service, with the optimization application 411 providing the expert proposal to the user (step 9340). The user can then determine if it is satisfactory or not (step 9400).

The wheel-rail lubrication and noise fleet management system 10, as discussed above, allows for the efficient maintenance of rail infrastructure and rail wheels which can decrease the of "wheel-climbing" and other known unfortunate wheel/rail dynamic occurrences, which can also lead to a decrease in the change of a rail vehicle derailing event. Rail-vehicle derailments are always events that should be avoided, considering the high probability of loss of lives, as well as the costs resulting from the damage and subsequent repairs. For example, the average derailment cost in the United States is currently estimated to be $1.4 million per derailment incident. Compared to prior wheel/rail lubrication or friction modifier systems in place today, like all the single operated devices or simple lubricant sticks, the efficiency and effectiveness of the this fleet wheel-rail lubrication and noise management systems can constitute a multiple on long-term cost savings and increase rail safety.

Further, by applying lubrication properly, utilizing the four principles discussed above, which are utilized by aspects of the present invention, corrugation and other wear and tear and rails and wheels can be reduced by 30% to 80%. By reducing the wear and tear, the time between the re-profiling and regrinding processed needed for wheels and rails can be increased by 1.4 to 2 time, or more in ideal circumstances. In addition, the life of the wheels and rails are increased as well, thereby increasing the cycle time for their replacement. These improvements lead to the savings of millions of dollars for transit authorities as well as preserving resources, including, but not limited to, steel, as well as a large reduction in the pollution resulting from the application of high-tech lubricants. Compared to prior wheel/rail lubrication or friction modifier systems in place today, like all the single operated onboard or wayside devices or simple lubricant sticks, the efficiency and effectiveness of the fleet wheel-rail lubrication and noise management systems can constitute a multiple on long-term cost savings and increase rail safety.

In addition, the proper application of lubrication by the systems and methods described above can lead to a reduction in friction between rails and wheels. In an aspect, the friction can be reduced by approximately 30-35%. Such a reduction in friction can lead to a reduction in energy needs by approximately 12-15% as well as reduce the number of engines (e.g., locomotives) needed to pull the rail-based vehicles.

In another aspect, the proper application of lubricant by the systems and methods described above can reduce curve squeaking, reducing the nuisance that can be caused to those residences and businesses in the vicinity of the rails. Such a reduction can increase the acceptance of rail-transit systems in populated areas, as well as improve an operator's image of using "quiet operating" vehicles. Compared to prior wheel/rail lubrication or friction modifier systems in place today, like all the single operated devices or simple lubricant sticks, the efficiency and effectiveness of the fleet wheel-rail lubrication and noise management systems disclosed above can determine a rail operation is accepted by the people.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A wheel-rail lubrication and noise fleet management system configured to control the lubrication needs of a fleet of rail-based vehicles comprising:
    a. at least one central fleet management server comprising a lubrication application;
    b. a plurality of lubrication systems remote from the at least one central fleet management server; and
    c. a plurality of lubrication controllers remote from the at least one central fleet management server, wherein each of the plurality of lubrication controllers is associated with and is configured to control at least one of the plurality of lubrication systems, wherein each of the plurality of lubrication controllers is further configured:
        i. to communicate with the associated at least one of the plurality of lubrication systems;
        ii. to communicate with at least one sensor; and
        iii. to communicate with the central fleet management server, wherein the lubrication application of the at least one central fleet management server is configured to receive communications from the plurality of lubrication controllers and to control operation of the plurality of lubrication controllers based on characteristics of a plurality of rail-based vehicles.

2. The wheel-rail lubrication and noise fleet management system of claim 1, wherein at least one of the plurality of lubrication controllers and the associated at least one of the plurality of lubrication systems are associated with at least one rail-based vehicle.

3. The wheel-rail lubrication and noise fleet management system of claim 2, wherein at least one of the plurality of lubrication controllers and the associated at least one of the plurality of lubrication systems is associated with at least one stationary wayside.

4. The wheel-rail lubrication and noise fleet management system of claim 1, wherein the central server further comprises a vehicle database, a track database, and a lubricant database, wherein the lubrication application is configured to access information from the vehicle database, the track database, and the lubricant database in order to develop and implement lubrication plans.

5. The wheel-rail lubrication and noise fleet management system of claim 4, wherein the lubricant database comprises lubricant properties specific to lubricants utilized by the wheel-rail lubrication and noise fleet management system, wherein the track database comprises track properties of tracks used by the rail-based vehicles of the fleet, and vehicle database comprises vehicle properties of the rail-based vehicles of the fleet, wherein the lubrication application utilizes the lubricant properties, the track properties, and the rail-based vehicle properties to develop and implement lubrication plans, wherein the lubrication plans are transmitted to the plurality of lubrication controllers.

6. The wheel-rail lubrication and noise fleet management system of claim 5, wherein the lubricant properties comprise physical properties and specific performance properties, the track properties comprise rail types, curve locations, lengths, degree of curve, and speed restraints, and the vehicle properties comprise vehicle types, wheel types, wheel profile types, and speed limitations, wherein the lubrication application utilizes the physical properties, specific performance properties, rail types, curve locations, lengths, degree of curve, speed restraints, vehicle types, wheel types, wheel profile types, and speed limitations to develop and implement the lubrication plans.

7. The wheel-rail lubrication and noise fleet management system of claim 5, wherein the lubrication application is further configured to receive feedback information from the plurality of lubrication controllers and wherein the lubrication application is further configured to update the lubrication plans using the feedback information.

8. The wheel-rail lubrication and noise fleet management system of claim 4, wherein each of the plurality of lubrication controllers further comprises a lubrication management application, wherein the lubrication management application is configured to implement at least one of the lubrication plans from the lubrication application.

9. The wheel-rail lubrication and noise fleet management system of claim 8, wherein the at least one of the lubrication plans is sent wirelessly from the lubrication application of the central server to the lubrication controller.

10. The wheel-rail lubrication and noise fleet management system of claim 8, wherein the lubrication management application is further configured to verify that the at least one lubrication plan can be carried out by the associated at least one of the plurality of lubrication systems.

11. The wheel-rail lubrication and noise fleet management system of claim 10, wherein the lubrication management application implements an older lubrication plan if the at least one lubrication plan cannot be carried out by the associated at least one of the plurality of lubrication systems.

12. The wheel-rail lubrication and noise fleet management system of claim 4, wherein the central server further comprises an optimization application configured to allow a user to request outside help to optimize the lubrication plans.

13. The wheel-rail lubrication and noise fleet management system of claim 1, wherein the wheel-rail lubrication and noise fleet management system is further configured to operate as an open platform for third party devices, and comprises at least one software plug-in interface to run functions specific to the third party devices.

14. A computer-based method for implementing lubrication plans for a plurality of rail-based vehicles of a rail-wheel system, comprising:
    a. providing at least one lubrication plan to a central fleet management server;
    b. selecting the at least one lubrication plan based on characteristics of a plurality of rail-based vehicles; and
    c. wirelessly transmitting the at least one lubrication plan to a plurality of lubrication controllers, each of the plurality of lubrication controllers associated with at least one lubrication system and remote to the central fleet management server, wherein at least a portion of the plurality of lubrication controllers is associated with rail-based vehicles.

15. The method of claim 14, wherein another portion of the plurality of lubrication controllers is associated with stationary waysides.

16. The method of claim 14, further comprising receiving feedback information from the plurality of lubrication controllers and updating the at least one lubrication plan using the feedback information.

17. A method for controlling lubricating needs of multiple vehicles on a track with a wheel-rail lubrication and noise fleet management system, the method comprising:
  a. providing at least one central server comprising a lubrication application;
  b. wirelessly transmitting instructions from the at least one central server to a plurality of lubrication controllers, wherein each of the plurality of lubrication controllers is associated with one vehicle on the track, wherein each lubrication controller is remote from the at least one central server, wherein the instructions are based on characteristics of a plurality of rail-based vehicles;
  c. providing at least one lubrication system with each of the plurality of lubrication controllers, wherein the at least one lubrication system is in electrical communication with the lubrication controller;
  d. wirelessly transmitting lubrication plans from the at least one central server to each of the plurality of lubrication controllers for dispersion of lubricant according to the lubrication plans;
  e. monitoring operations of each of the lubrication systems with at least one sensor associated with each of the lubrication systems, the at least one sensor transmitting a sensor signal to the lubrication controller associated with the lubrication system; and
  f. transmitting the sensor signal from each of the plurality of lubrication controllers to the at least one central server.

18. The method of claim 17, wherein the sensor signal is used to update the lubrication plans by the lubrication application.

19. The method of claim 17, wherein wirelessly transmitting lubrication plans from the at least one central server to each of the plurality of lubrication controllers further comprises each of the plurality of lubrication controllers verifying the lubrication plans can be implemented by the lubrication systems.

20. The method of claim 19, further comprising implementing an old lubrication plan by a portion of the lubrication controllers that cannot verify the implementation of the lubrication plans transmitted by the at least one central server.

21. A wheel-rail lubrication and noise fleet management system configured to control lubrication needs of a fleet of rail-based vehicles comprising:
  a. at least one central fleet management server comprising a lubrication application;
  b. a first lubrication system remote from the at least one central fleet management server and located on a first train;
  c. a second lubrication system remote from the at least one central fleet management server and located on a second train; and
  d. a first lubrication controller remote from the at least one central fleet management server and associated with and configured to control the first lubrication system; and
  e. a second lubrication controller remote from the at least one central fleet management server and associated with and configured to control the second lubrication system, wherein the first lubrication controller and the second lubrication controller are each further configured to communicate with at least one sensor and to communicate with the central fleet management server, and wherein the lubrication application of the at least one central fleet management server is configured to control the operation of and receive communications from the plurality of lubrication controllers based on characteristics of the first train and the second train.

* * * * *